United States Patent
Ayars et al.

(10) Patent No.: US 10,423,977 B1
(45) Date of Patent: Sep. 24, 2019

(54) METHOD AND APPARATUS FOR GENERATING AN ELECTRONIC COMMUNICATION

(71) Applicant: Groupon, Inc., Chicago, IL (US)

(72) Inventors: Jeff Ayars, Seattle, WA (US); Ruslan Gilfanov, Palo Alto, CA (US); Jeff Holden, Chicago, IL (US); John M. Nickels, Chicago, IL (US); Pete Prokopowicz, Chicago, IL (US); Dan Roarty, Chicago, IL (US); David Thacker, Palo Alto, CA (US)

(73) Assignee: GROUPON, INC., Chicago, IL (US)

( * ) Notice: Subject to any disclaimer, the term of this patent is extended or adjusted under 35 U.S.C. 154(b) by 180 days.

(21) Appl. No.: 13/930,527

(22) Filed: Jun. 28, 2013

(51) Int. Cl.
*G06Q 30/02* (2012.01)

(52) U.S. Cl.
CPC .............................. *G06Q 30/0243* (2013.01)

(58) Field of Classification Search
USPC .......................................................... 705/14
See application file for complete search history.

(56) References Cited

U.S. PATENT DOCUMENTS

| | | | |
|---|---|---|---|
| 5,960,407 A | 9/1999 | Vivona | |
| 6,401,075 B1 | 6/2002 | Mason et al. | |
| 7,076,695 B2 | 7/2006 | McGee et al. | |
| 7,580,878 B1 | 8/2009 | Nieto | |
| 7,882,046 B1 | 2/2011 | Kizhakkekalathil et al. | |
| 7,912,748 B1 | 3/2011 | Rosenberg et al. | |
| 8,050,976 B2 | 11/2011 | Staib et al. | |
| 8,354,926 B2 | 1/2013 | Donovan et al. | |
| 8,645,190 B1 | 2/2014 | Juda et al. | |
| 9,105,046 B1 | 8/2015 | Dias et al. | |

(Continued)

FOREIGN PATENT DOCUMENTS

JP 2005-023648 A 1/2005

OTHER PUBLICATIONS

Office Action from U.S. Appl. No. 13/930,519, dated Jun. 4, 2015.

(Continued)

*Primary Examiner* — David J Stoltenberg
*Assistant Examiner* — Gautam Ubale
(74) *Attorney, Agent, or Firm* — Alston & Bird LLP

(57) ABSTRACT

A method, apparatus, and computer program product are disclosed to improve generation of electronic communications. The method may provide a plurality of content slots each configured to receive content, the content comprising at least one of promotion content or non-promotion content. The method may also include maintaining a database comprising a plurality of promotion content generators and non-promotion content generators, and determining, using a processor, one of the plurality of promotion content generators or non-promotion content generators for respectively supplying corresponding promotion content or non-promotion content to each of the plurality of content slots. The determining the one of the plurality of promotion content generators or non-promotion content generators may include determining selection parameters, and scoring the plurality of promotion content generators and non-promotion content generators based at least in part on the selection parameters.

18 Claims, 12 Drawing Sheets

(56) References Cited

U.S. PATENT DOCUMENTS

| | | |
|---|---|---|
| 9,305,310 B2 | 4/2016 | Radhakrishnan et al. |
| 2003/0079160 A1 | 4/2003 | McGee et al. |
| 2003/0135460 A1 | 7/2003 | Talegon |
| 2003/0177112 A1 | 9/2003 | Gardner |
| 2004/0068455 A1 | 4/2004 | Jacobus et al. |
| 2004/0068459 A1 | 4/2004 | Goulet et al. |
| 2004/0168123 A1 | 8/2004 | Lomelin-Stoupignan et al. |
| 2005/0189414 A1 | 9/2005 | Fano et al. |
| 2006/0095281 A1 | 5/2006 | Chickering et al. |
| 2006/0161504 A1 | 7/2006 | Walser et al. |
| 2006/0287916 A1 | 12/2006 | Starr et al. |
| 2007/0055554 A1 | 3/2007 | Sussman et al. |
| 2007/0244977 A1 | 10/2007 | Atkins |
| 2008/0004962 A1 | 1/2008 | Muthukrishnan et al. |
| 2008/0059384 A1 | 3/2008 | Eglen et al. |
| 2008/0091524 A1 | 4/2008 | Yan et al. |
| 2008/0140508 A1* | 6/2008 | Anand .................. G06Q 30/02 705/14.43 |
| 2009/0055405 A1 | 2/2009 | Brier et al. |
| 2009/0089173 A1 | 4/2009 | Miyake |
| 2009/0210286 A1 | 8/2009 | Bisdikian |
| 2009/0249321 A1 | 10/2009 | Mandyam et al. |
| 2009/0265243 A1 | 10/2009 | Karassner et al. |
| 2009/0327037 A1 | 12/2009 | Ng et al. |
| 2010/0016080 A1 | 1/2010 | Garden et al. |
| 2010/0037157 A1 | 2/2010 | Chang et al. |
| 2010/0042490 A1 | 2/2010 | Boal |
| 2010/0063877 A1 | 3/2010 | Soroca et al. |
| 2010/0198694 A1* | 8/2010 | Muthukrishnan .. G06Q 30/0275 705/14.71 |
| 2010/0287103 A1 | 11/2010 | Mason |
| 2010/0313139 A1* | 12/2010 | Watfa .................... G06F 16/337 715/745 |
| 2010/0318407 A1* | 12/2010 | Leff ...................... G06Q 10/107 705/14.1 |
| 2011/0035744 A1 | 2/2011 | Bhatia |
| 2011/0099077 A1 | 4/2011 | Darin et al. |
| 2011/0131099 A1 | 6/2011 | Shields et al. |
| 2011/0153412 A1 | 6/2011 | Novikov et al. |
| 2011/0196731 A1 | 8/2011 | Christie et al. |
| 2012/0066055 A1 | 3/2012 | Nomula |
| 2012/0089461 A1* | 4/2012 | Greenspan ............. G06Q 20/12 705/14.58 |
| 2012/0096429 A1 | 4/2012 | Desai et al. |
| 2012/0226526 A1 | 9/2012 | Donovan et al. |
| 2012/0226543 A1 | 9/2012 | Dayala |
| 2012/0259866 A1* | 10/2012 | Austin ................ G06F 17/3089 707/748 |
| 2013/0166360 A1 | 6/2013 | Kshetramade et al. |
| 2013/0211961 A1 | 8/2013 | Walker et al. |
| 2013/0238424 A1 | 9/2013 | Ramer et al. |
| 2013/0246207 A1 | 9/2013 | Novak et al. |
| 2013/0325585 A1 | 12/2013 | Amit et al. |
| 2013/0326354 A1* | 12/2013 | Anderson .......... G06Q 30/0241 715/733 |
| 2013/0339137 A1 | 12/2013 | Lempel et al. |
| 2014/0006139 A1 | 1/2014 | Aggarwal et al. |
| 2014/0074595 A1* | 3/2014 | Chomsky ........... G06Q 30/0276 705/14.45 |
| 2014/0351268 A1 | 11/2014 | Weskamp et al. |

OTHER PUBLICATIONS

Office Action from U.S. Appl. No. 13/930,532, dated Jun. 18, 2015.
Notice of Allowance from U.S. Appl. No. 14/453,179 dated Jul. 28, 2016.
Office Action from U.S. Appl. No. 13/930,519, dated Apr. 1, 2016.
Office Action from U.S. Appl. No. 13/930,532, dated Mar. 4, 2016.
U.S. Patent Application for U.S. Appl. No. 13/826,333, filed Mar. 14, 2013; In re: Shariff et al., entitled Method, Apparatus, and Computer Program Product for Forecasting Demand.
U.S. Appl. No. 13/839,360, filed Mar. 15, 2013; In re: Chang et al., entitled Dynamic Promotion Analytics.
U.S. Appl. No. 13/826,866, filed Mar. 14, 2013; In re: Shariff et al., entitled Method, Apparatus, and Computer Program Product for Calculating a Provider Quality Score.
U.S. Appl. No. 13/460,745, filed Apr. 30, 2012; In re: Thacker et al., entitled Sales Enhancement System.
U.S. Appl. No. 13/411,502, filed Mar. 2, 2012; In re: O'Brien et al., entitled Relevance System for Consumer Deals.
U.S. Appl. No. 13/219,344, filed Aug. 26, 2011; In re: Bhat et al., entitled Embedded Storefront.
U.S. Application filed Mar. 15, 2013, U.S. Appl. No. 13/839,958.
U.S. Application filed Mar. 15, 2013, U.S. Appl. No. 13/838,711.
U.S. Application filed Mar. 15, 2013, U.S. Appl. No. 13/838,415.
U.S. Application filed Jun. 28, 2013, U.S. Appl. No. 13/930,519.
How to Write Advertisements that Sell, author unknown, from System, the magazine of Business, dated 1912, downloaded from http://library.duke.edu/digitalcollections/eaa_Q0050/ on Feb. 21, 2015.

* cited by examiner

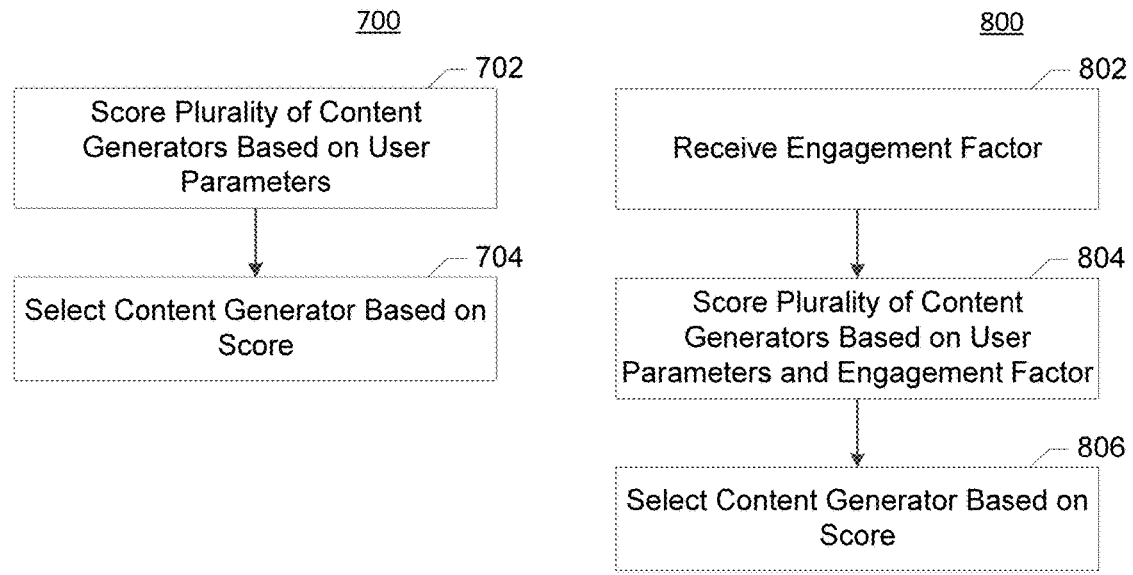
FIG. 7
FIG. 8
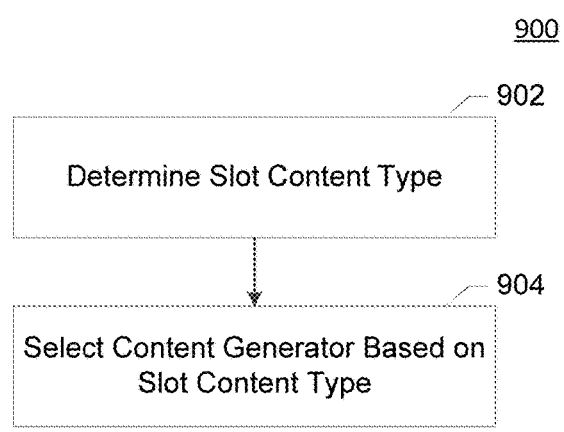
FIG. 9

METHOD AND APPARATUS FOR GENERATING AN ELECTRONIC COMMUNICATION

TECHNOLOGICAL FIELD

Example embodiments of the present invention relate generally to determining content for an electronic communication and, more particularly, to a method and apparatus for selecting content generators for use in generating an electronic communication.

BACKGROUND

Applicant has discovered problems with current methods for generating electronic communications. Through applied effort, ingenuity, and innovation, Applicant has solved many of these identified problems by developing a solution that is embodied by the present invention, which is described in detail below.

BRIEF SUMMARY

Accordingly, a method, apparatus, and computer program product are provided for determining promotion pricing parameters. Example embodiments may include a method for generating an electronic communication for displaying one or more promotions to a user. The method may include providing a plurality of content slots each configured to receive content. The content may include at least one of promotion content or non-promotion content. The method may also include maintaining a database comprising a plurality of promotion content generators and non-promotion content generators, and determining, using a processor, one of the plurality of promotion content generators or non-promotion content generators for respectively supplying corresponding promotion content or non-promotion content to each of the plurality of content slots. Determining the one of the plurality of promotion content generators or non-promotion content generators may include determining selection parameters, determining a promotion content engagement factor, and scoring the plurality of promotion content generators and non-promotion content generators based at least in part on the selection parameters and the promotion content engagement factor. The promotion content engagement factor may be determined based on promotion content hover information. The promotion content engagement factor may be determined based on promotion content click-through information. The promotion content engagement factor may be determined based on promotion content purchase information.

Embodiments may also provide an apparatus for generating an electronic communication for displaying one or more promotions to a user. The apparatus may include at least one processor and a memory. The memory may include instructions that, when executed by the at least one processor, cause the at least one processor to configure the apparatus. The instructions may configure the apparatus to provide a plurality of content slots each configured to receive content. The content may include at least one of promotion content or non-promotion content. The instructions may also configure the apparatus to maintain a database comprising a plurality of promotion content generators and non-promotion content generators, and to determine one of the plurality of promotion content generators or non-promotion content generators for respectively supplying corresponding promotion content or non-promotion content to each of the plurality of content slots. The apparatus may be configured by the instructions to determine the one of the plurality of promotion content generators or non-promotion content generators by determining selection parameters, determining a promotion content engagement factor, and scoring the plurality of promotion content generators and non-promotion content generators based at least in part on the selection parameters and the promotion content engagement factor. The promotion content engagement factor may be determined based on promotion content hover information. The promotion content engagement factor may be determined based on promotion content click-through information. The promotion content engagement factor may be determined based on promotion content purchase information.

Embodiments may also provide a non-transitory computer readable medium comprising instructions that, when executed by a processor, cause the processor to configure an apparatus. The instructions may configure the apparatus to provide a plurality of content slots each configured to receive content. The content may include at least one of promotion content or non-promotion content. The instructions may also configure the apparatus to maintain a database comprising a plurality of promotion content generators and non-promotion content generators, and to determine one of the plurality of promotion content generators or non-promotion content generators for respectively supplying corresponding promotion content or non-promotion content to each of the plurality of content slots. The apparatus may be configured to determine the one of the plurality of promotion content generators or non-promotion content generators by determining selection parameters, determining a promotion content engagement factor, and scoring the plurality of promotion content generators and non-promotion content generators based at least in part on the selection parameters and the promotion content engagement factor. The promotion content engagement factor may be determined based on promotion content hover information. The promotion content engagement factor may be determined based on promotion content click-through information. The promotion content engagement factor may be determined based on promotion content purchase information.

Embodiments may also provide another method for generating an electronic communication for displaying one or more promotions to a user. The method may include providing at least one promotion content slot and at least one non-promotion content slot, maintaining a database comprising a plurality of promotion content generators and non-promotion content generators, and determining, using a processor, one of the plurality of promotion content generators or non-promotion content generators for respectively supplying corresponding promotion content or non-promotion content to each of the promotion content slots and the non-promotion content slots. The act of determining the one of the plurality of promotion content generators or non-promotion content generators may include determining selection parameters, and scoring the plurality of promotion content generators and non-promotion content generators based at least in part on the selection parameters. The at least one promotion content slot may be configured to only receive content from a promotion content generator and the at least one non-promotion content slot may be configured to only receive content from a non-promotion content generator.

Embodiments may also provide another apparatus for generating an electronic communication for displaying one or more promotions to a user. The apparatus may include at least one processor and a memory, the memory comprising instructions that, when executed by the at least one processor, cause the at least one processor to configure the apparatus. The instructions may configure the apparatus to maintain a database including a plurality of promotion content generators and non-promotion content generators, and to determine one of the plurality of promotion content generators or non-promotion content generators for respectively supplying corresponding promotion content or non-promotion content to each of the promotion content slots and the non-promotion content slots. The apparatus may be configured by the instructions to determine the one of the plurality of promotion content generators or non-promotion content generators by determining selection parameters, and scoring the plurality of promotion content generators and non-promotion content generators based at least in part on the selection parameters. The at least one promotion content slot may be configured to only receive content from a promotion content generator and the at least one non-promotion content slot may be configured to only receive content from a non-promotion content generator.

Embodiments may also include another non-transitory computer readable medium comprising instructions that, when executed by a processor, cause the processor to configure an apparatus to maintain a database comprising a plurality of promotion content generators and non-promotion content generators, and to determine one of the plurality of promotion content generators or non-promotion content generators for respectively supplying corresponding promotion content or non-promotion content to each of the promotion content slots and the non-promotion content slots. The apparatus may be configured to determine the one of the plurality of promotion content generators or non-promotion content generators by determining selection parameters, and scoring the plurality of promotion content generators and non-promotion content generators based at least in part on the selection parameters. The at least one promotion content slot may be configured to only receive content from a promotion content generator and the at least one non-promotion content slot may be configured to only receive content from a non-promotion content generator.

Embodiments may include yet another method for generating an electronic communication for displaying one or more promotions to a user. The method may include providing promotion content slots and non-promotion content slots, and determining a preliminary promotion content for each of the promotion content slots. The preliminary promotion content may include a merchant indication, a promotion indication, and a promotion location indication. The method may also include evaluating the preliminary promotion content according to a set of electronic communication rules. The evaluation may include determining whether at least one of the merchant indication, the promotion indication, and the promotion location indication for the preliminary promotion content of each of the promotion content slots violates the electronic communication rules. The method may also include determining display promotion content for each of the promotion content slots based on the evaluation of the preliminary promotion content according to the set of electronic communication rules. The method may also include altering the display promotion content in response to determining that at least one of the electronic communication rules are violated.

Embodiments may provide yet another apparatus for generating an electronic communication for displaying one or more promotions to a user. The apparatus may include at least one processor and a memory, the memory comprising instructions that, when executed by the at least one processor, cause the at least one processor to configure the apparatus. The apparatus may be configured to provide promotion content slots and non-promotion content slots, to determine a preliminary promotion content for each of the promotion content slots, the preliminary promotion content comprising a merchant indication, a promotion indication, and a promotion location indication, to evaluate the preliminary promotion content according to a set of electronic communication rules, the evaluation including determining whether at least one of the merchant indication, the promotion indication, and the promotion location indication for the preliminary promotion content of each of the promotion content slots violates the electronic communication rules, and to determine display promotion content for each of the promotion content slots based on the evaluation of the preliminary promotion content according to the set of electronic communication rules. The apparatus may also be configured to alter the display promotion content in response to determining that at least one of the electronic communication rules are violated.

Embodiments may provide yet another non-transitory computer readable medium comprising instructions that, when executed by a processor, cause the processor to configure an apparatus. The instructions may cause the processor to configure the apparatus to provide promotion content slots and non-promotion content slots, and to determine a preliminary promotion content for each of the promotion content slots. The preliminary promotion content may include a merchant indication, a promotion indication, and a promotion location indication. The instructions may further cause the processor to configure the apparatus to evaluate the preliminary promotion content according to a set of electronic communication rules. The evaluation may include determining whether at least one of the merchant indication, the promotion indication, and the promotion location indication for the preliminary promotion content of each of the promotion content slots violates the electronic communication rules. The instructions may further cause the processor to configure the apparatus to determine display promotion content for each of the promotion content slots based on the evaluation of the preliminary promotion content according to the set of electronic communication rules. The instructions may also configure the apparatus to alter the display promotion content in response to determining that at least one of the electronic communication rules are violated.

Embodiments may provide yet another method. The method may include presenting promotion content and non-promotion content via an interface, receiving, via the interface, a user selection indication associated with at least one of the promotion content and the non-promotion content, updating, using a processor, a user record of a relevance database based on the user selection indication, and maintaining a database comprising a plurality of promotion content generators and non-promotion content generators. The at least one of the promotion content generators or non-promotion content generators may be configured to respectively generate promotion content or non-promotion content based at least in part on the user record. An efficacy of one of the plurality of promotion content generators and non-promotion content generators may be determined based on the user record. The method may also include selecting one of the plurality of promotion content generators and non-promotion content generators for use in generation of an electronic communication based on the efficacy.

Embodiments may further provide another apparatus for generating an electronic communication for displaying one or more promotions to a user. The apparatus may include at least one processor and a memory. The memory may include instructions that, when executed by the at least one processor, cause the at least one processor to configure the apparatus. The processor may configure the apparatus to present promotion content and non-promotion content via an interface, to receive, via the interface, a user selection indication associated with at least one of the promotion content and the non-promotion content, to update a user record of a relevance database based on the user selection indication, and to maintain a database comprising a plurality of promotion content generators and non-promotion content generators. The at least one of the promotion content generators or non-promotion content generators may be configured to respectively generate promotion content or non-promotion content based at least in part on the user record. An efficacy of one of the plurality of promotion content generators and non-promotion content generators may be determined based on the user record. The apparatus may be further configured to select one of the plurality of promotion content generators and non-promotion content generators for use in generation of an electronic communication based on the efficacy.

Embodiments may provide yet another non-transitory computer readable medium comprising instructions that, when executed by a processor, cause the processor to configure an apparatus. The instructions may cause the processor to configure the apparatus to present promotion content and non-promotion content via an interface, to receive, via the interface, a user selection indication associated with at least one of the promotion content and the non-promotion content to update a user record of a relevance database based on the user selection indication, and to maintain a database comprising a plurality of promotion content generators and non-promotion content generators. The at least one of the promotion content generators or non-promotion content generators are configured to respectively generate promotion content or non-promotion content based at least in part on the user record. An efficacy of one of the plurality of promotion content generators and non-promotion content generators may be determined based on the user record. The instructions may further cause the processor to configure the apparatus to select one of the plurality of promotion content generators and non-promotion content generators for use in generation of an electronic communication based on the efficacy.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
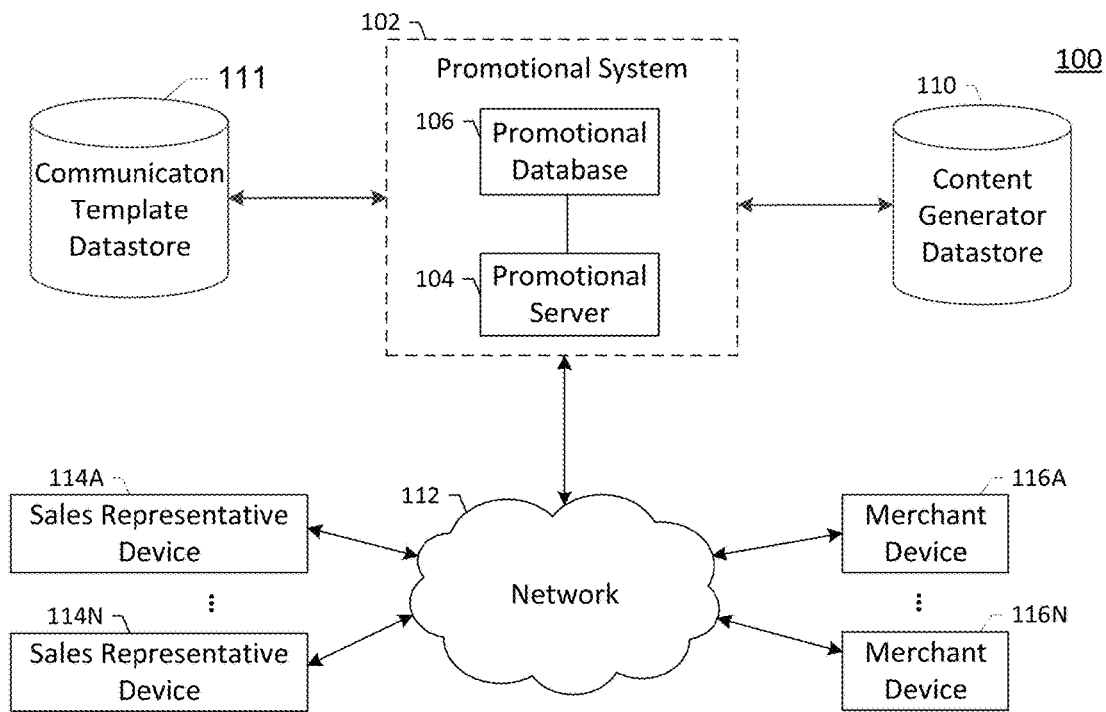
Figure 2:
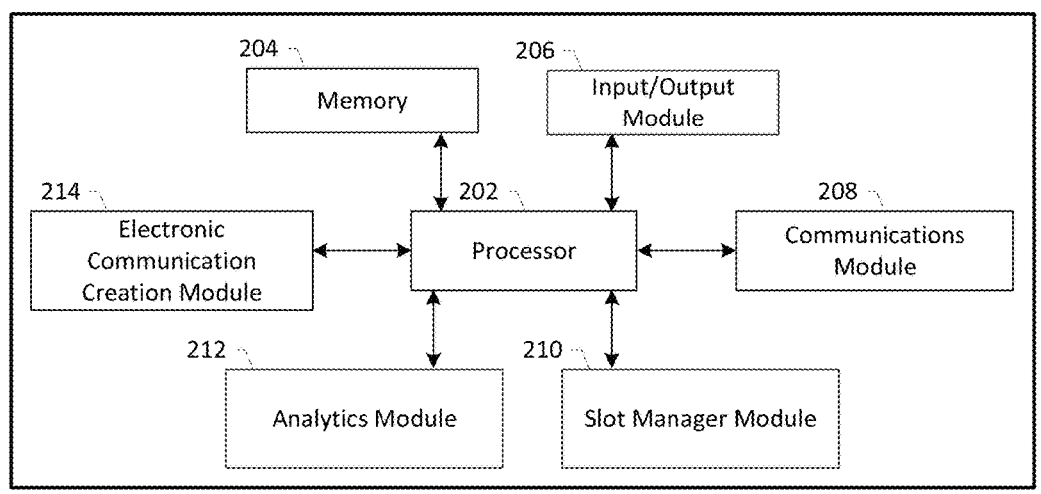
Figure 3:
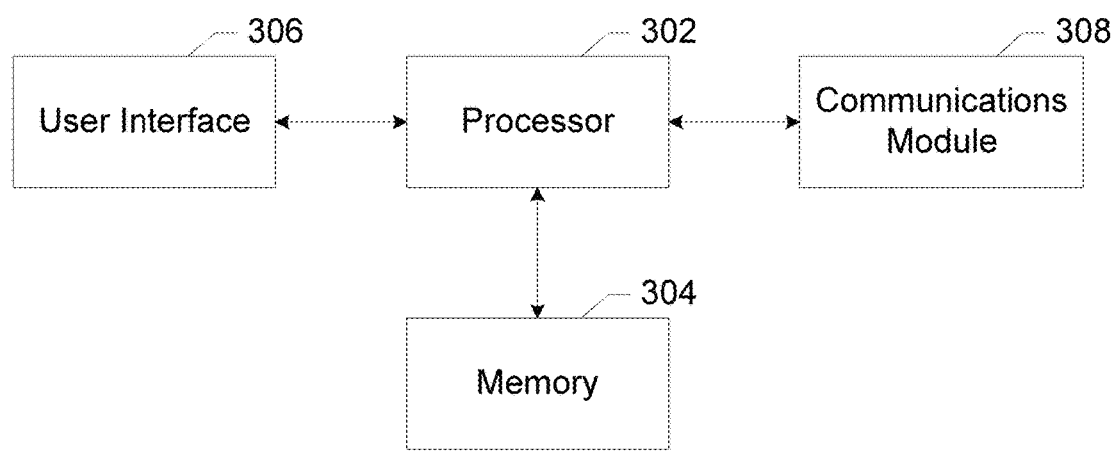
Figure 4:
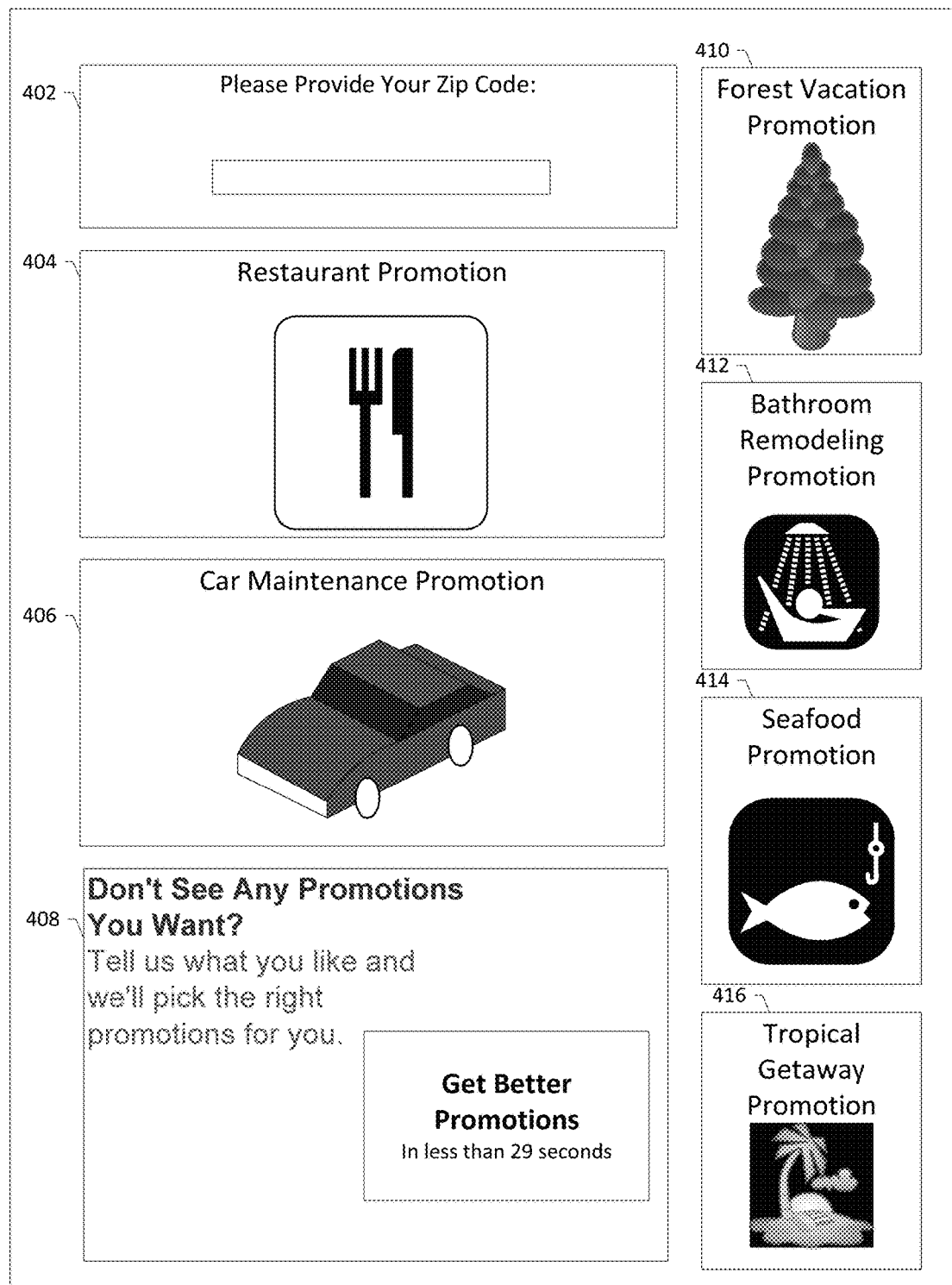
Figure 5:
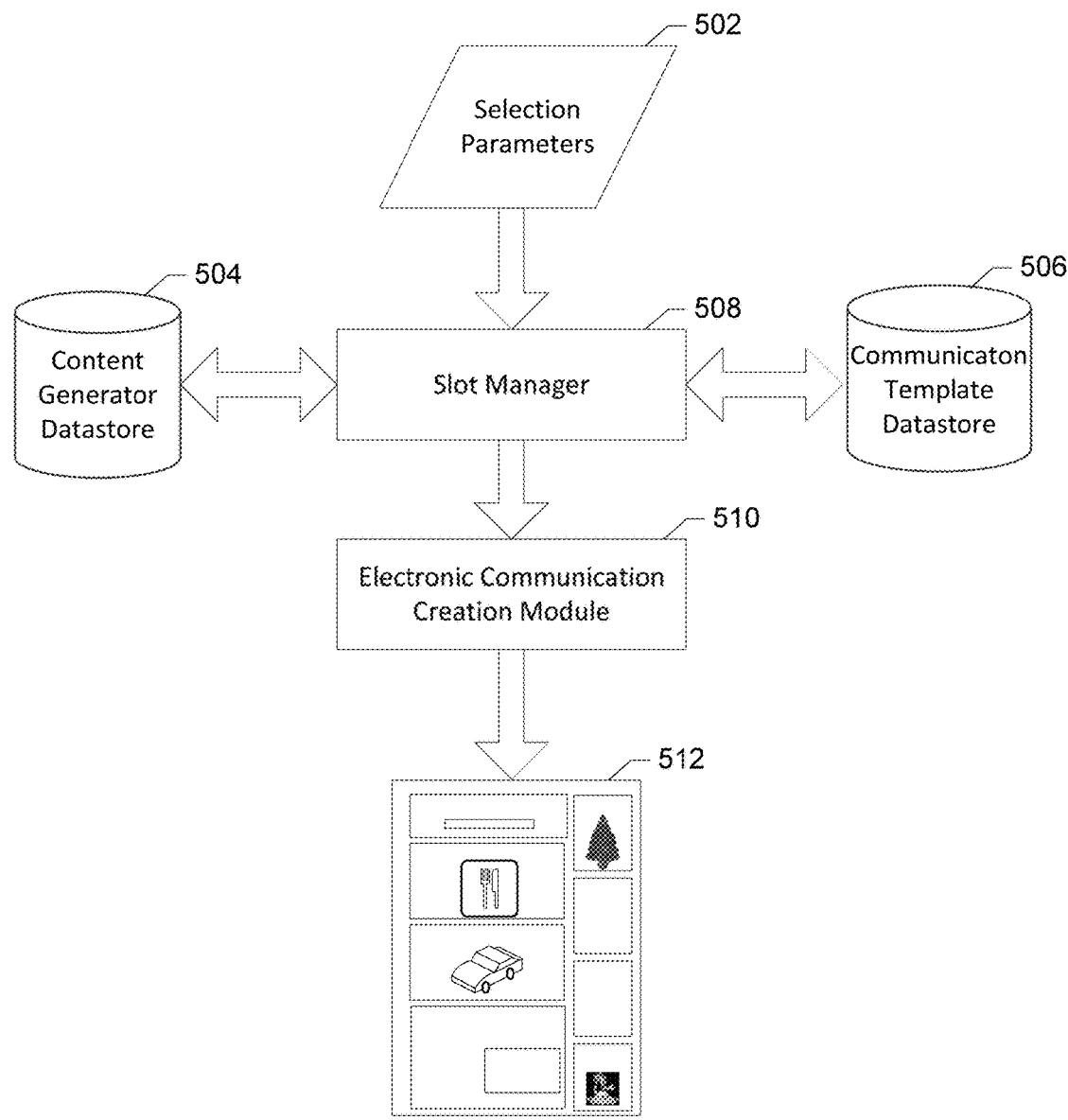
Figure 6:
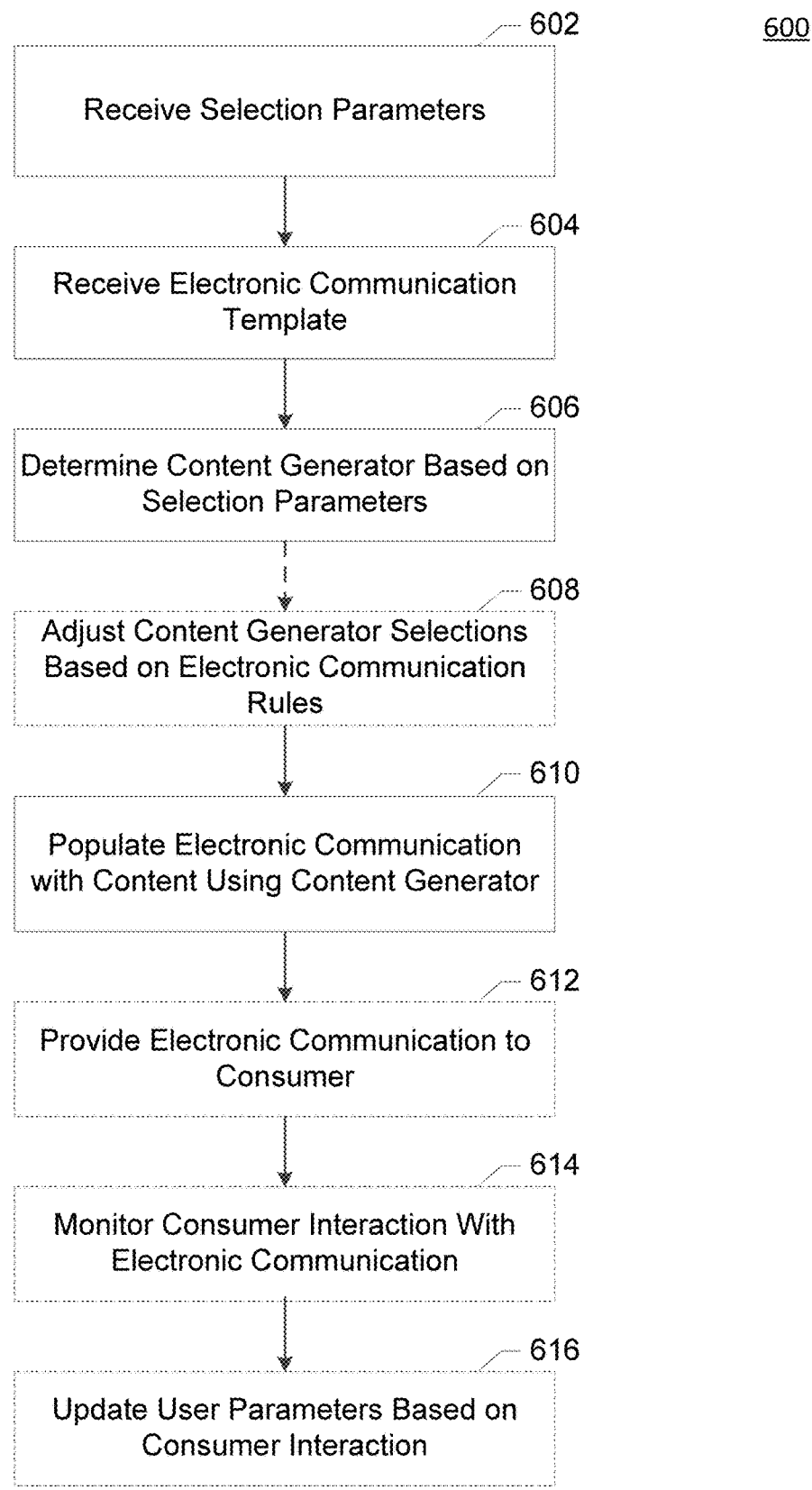
Figure 10:
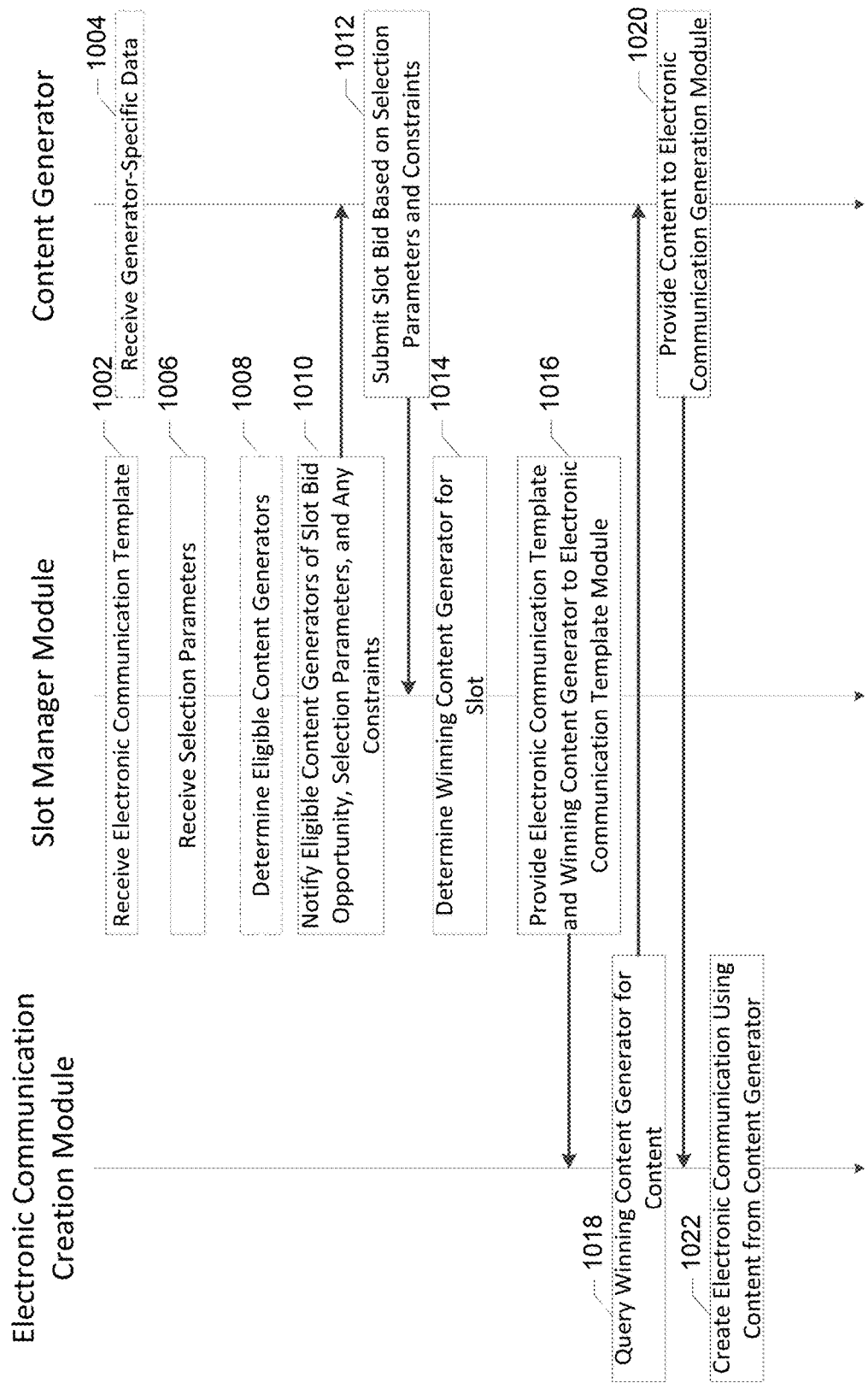
Figure 11:
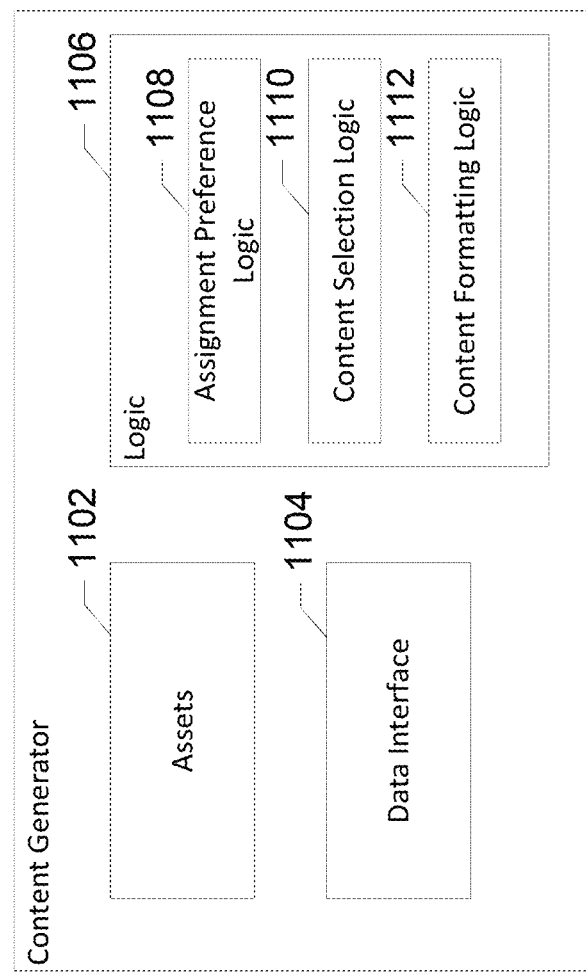
Figure 12:
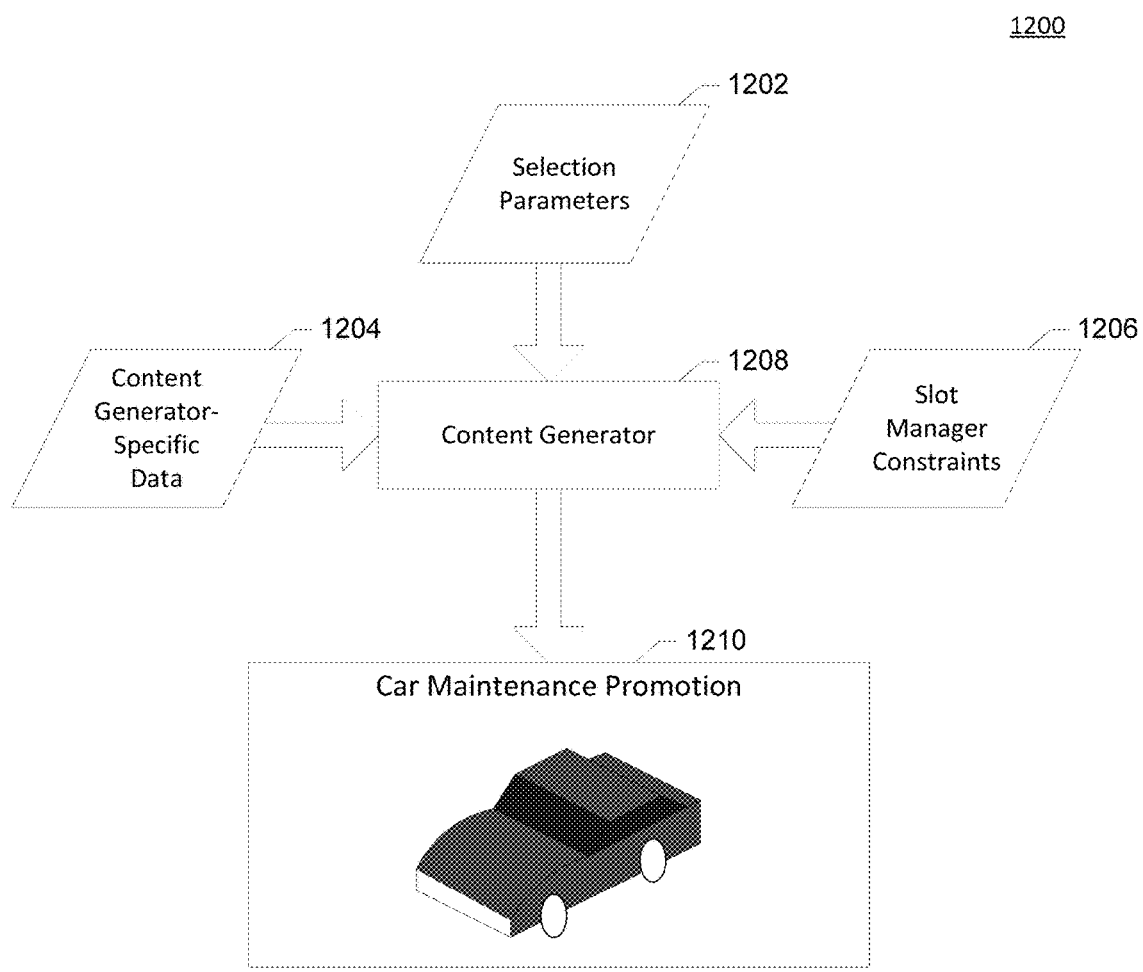
Figure 13:
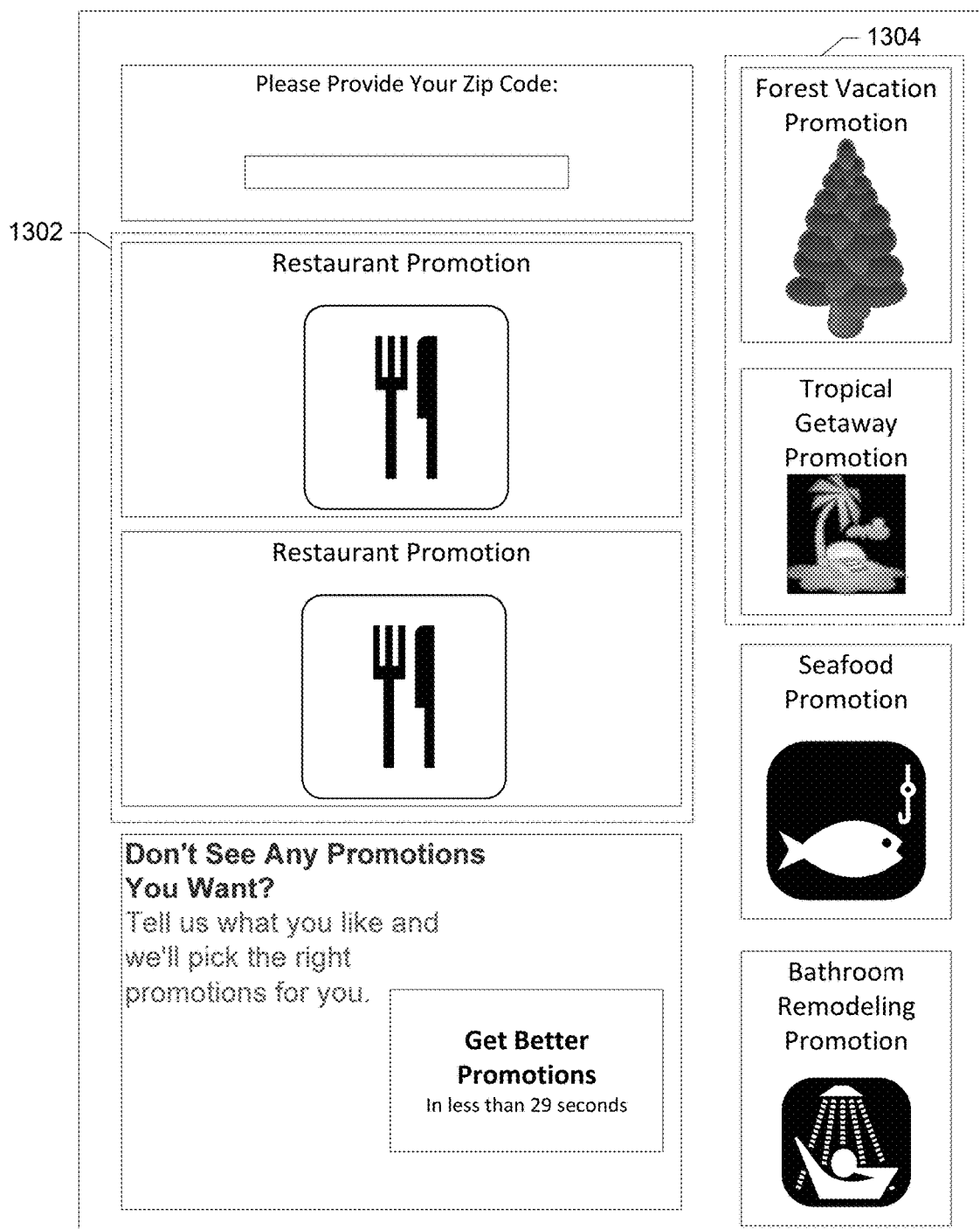
Figure 14:
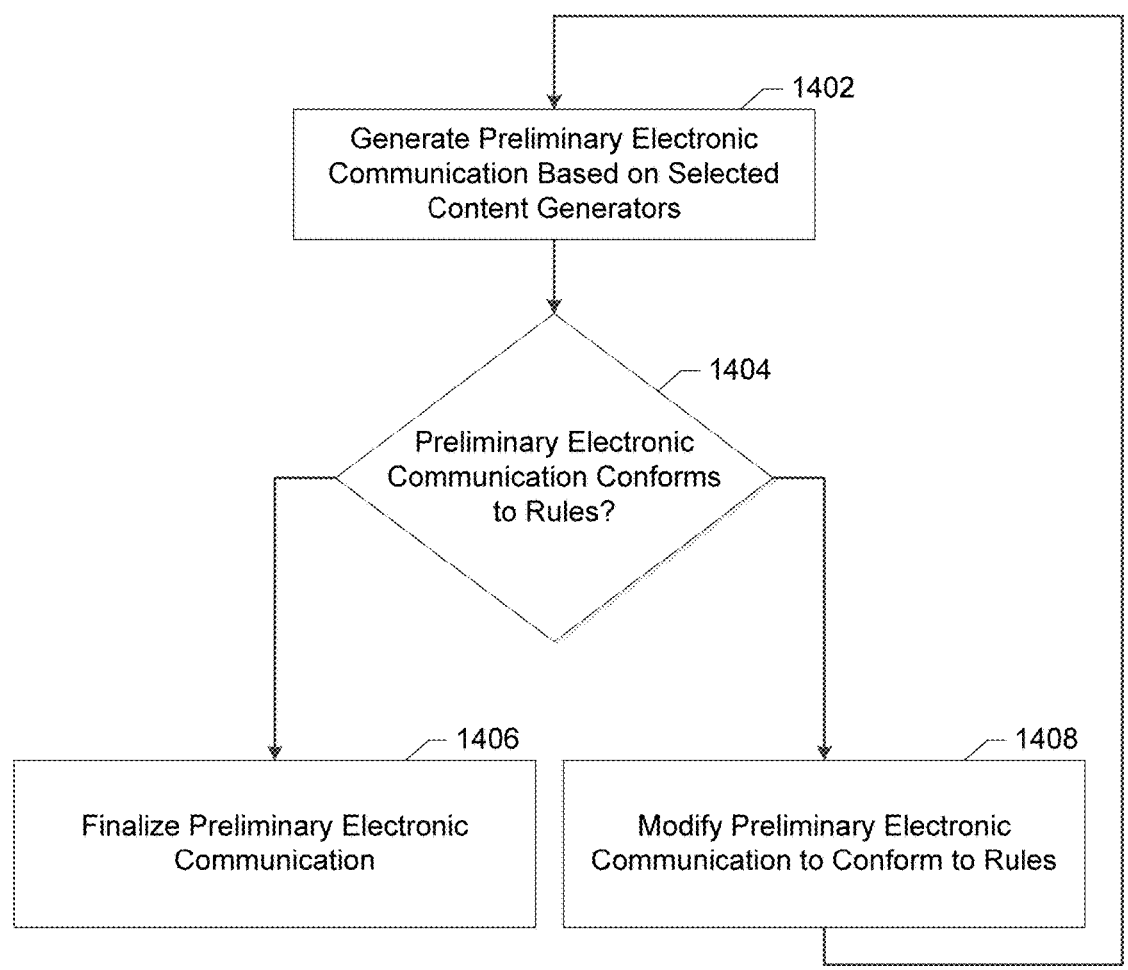
Figure 15:
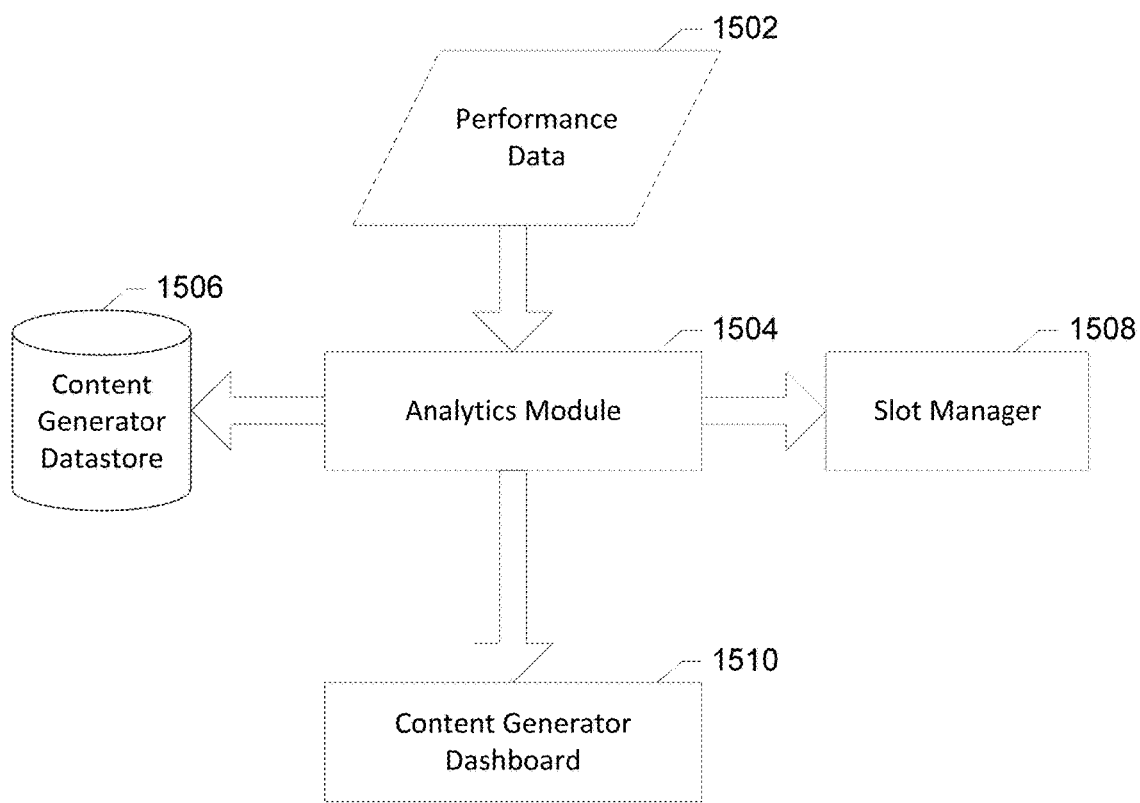

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for use in a promotional server, in accordance with some example embodiments of the present invention;

FIG. 3 illustrates a block diagram showing an example device for use by a consumer, sales representative or merchant, in accordance with an example embodiment of the present invention;

FIG. 4 illustrates an example electronic communication, in accordance with some example embodiments;

FIG. 5 illustrates an example data flow for generating an electronic communication, in accordance with some example embodiments;

FIG. 6 illustrates a flowchart describing example operations for generating an electronic communication, in accordance with some example embodiments;

FIGS. 7-9 illustrate flowcharts describing example operations for selecting content generators, in accordance with some example embodiments;

FIG. 10 illustrates a signaling diagram showing interactions among elements of a promotion and marketing service in accordance with some example embodiments;

FIG. 11 illustrates an example block diagram of an example content generator in accordance with some example embodiments;

FIG. 12 illustrates an example data flow for generating content for an electronic communication using a content generator in accordance with some example embodiments;

FIG. 13 illustrates an example preliminary electronic communication in accordance with some example embodiments;

FIG. 14 illustrates a flowchart describing example operations for applying communication rules to a set of preliminary electronic communication content in accordance with some example embodiments; and FIG. 15 illustrates an example data flow for employing content generator analytics in accordance with some example embodiments.

DETAILED DESCRIPTION

Introduction and Definitions

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. One example merchant may be a running company that sells attire for use by a person who runs or participates in athletic activities.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. In this example, the residual value may be equal to the accepted value.

As used herein, the term "electronic communication" should be understood to include any form of communication that may be perceivable by a recipient. For example, an "electronic communications" may include, but is not necessarily limited to, an e-mail message, a web-page, a streaming video, a display in an application, or the like. In some embodiments, the electronic communication may take the form of data that is rendered by an application (e.g., a web browser, an e-mail client, a video player, or the like). The electronic communication may include executable code (e.g., Hypertext Markup Language 5 (HTML5), JavaScript, or the like), static data (e.g., Hypertext Markup Language (HTML)), or some combination thereof. For example, embodiments may be employed to generate an e-mail or webpage for transmission to consumers to provide promotion or marketing materials. As such, electronic communications should be understood to include both static communications (e.g., e-mails and static webpages) and dynamic communications (e.g., dynamic web pages that adjust the content of the page based on user information such as the user's location).

As used herein, the term "content generator" should be understood to include any method, process, application, algorithm, or the like that is operable to select content for an electronic communication. For example, content generators may be "widgets", "apps", "applets" or any other software or method that, when executed or performed by a programmed computer, provides content for insertion into an electronic communication, such as by providing content to fill a slot of the electronic communication. Content generators may be associated with particular types of content. For example, content generators may be associated with only promotion content or non-promotion content, content generators may be associated with a particular type of promotion (e.g., a content generator for promotions redeemable for a particular good, a content generator for promotions redeemable for a particular discount value, or a content generator for promotions redeemable for a particular vacation), a particular type of merchant (e.g., a content generator for restaurant promotions, a content generator for spa treatment promotions, or a content generator for home remodeling promotions), a particular date (e.g., content generators for Valentine's Day, Tax Return day, the Fourth of July, or Labor Day), a particular season (e.g., content generators for ski trips in the Winter, and different content generators for beach trips in the summer), a particular location (e.g., a content generator for promotions in a particular zip code or state, or a content generator related to a specific latitude and longitude), a particular data gathering operation (e.g., a content generator to request a consumer's zip code, a content generator to request a consumer's favorite restaurant type), a particular notification type (e.g., a content generator to inform a consumer of the promotion and marketing service's privacy policy), a particular type of interest as express explicitly or implicitly by a user (e.g., filling out a questionnaire indicating "I like Italian food and luxury goods deals"), based on a user's relationship status (e.g., content generators for "Date Night" content for married couples with children), consumer social network activity (e.g., content generators that detect pages the user has "liked" and select content accordingly), or any other type of content that may be suitable for inclusion in an electronic communication.

Content generators may include content to be provided by the content generator, or the content may be stored external to the content generator and the content generator may access or provide access (i.e., by providing a database address, etc.) to the externally stored content. For example, a particular content generator may store a set of promotion parameters, images, and terms for a given promotion, and provide said parameters, images, and terms for use in an electronic communication, or the promotion parameters, images, and terms may be stored in a promotion database and the content generator may provide a reference to or address for the parameters, images, and terms for generation of an electronic communication.

Content generators may also include assignment preference logic. Content generators may have certain preferences for certain electronic communications or certain slots within a communication. For example, a content generator may include assignment preference logic that indicates a preference to be included in e-mail electronic communications rather than webpage electronic communications, or the content generator may include preference data that indicates a preference to be included in an electronic communication only when the content generator is assigned to the first slot displayed within the electronic communication.

As used herein, the terms "slot" and "content slot" should be understood to refer to a defined region of the electronic communication into which content may be inserted. Slots may be defined by particular coordinates in an n-dimensional coordinate space (e.g., x and y coordinates establishing absolute positions within the electronic communication), a particular position relative to other slots within the electronic communication (e.g., display slot 1 at the top of the electronic communication, then slot 2, then slot 3, etc.), based on particular rules for the electronic communication (e.g., a title slot, a sidebar slot, a pop-up advertisement slot, a hover-over slot), or according to any other mechanism for dividing the electronic communication into one or more regions. Slots may be associated with a particular type of content (e.g., a promotion content slot and a non-promotion content slot), or slots may be operable to receive any type of content.

Overview

A method, apparatus, and computer program product are provided in accordance with an example embodiment of the present invention in order to provide improved generation of electronic communications. In order to entice consumers to purchase promotions, a promotion and marketing service may use electronic communications to ensure that consumers are aware of the promotions offered by the promotion and marketing service. However, these electronic communications are generally not amenable to a "one size fits all" solution, as the promotion inventory offered by the promotion and marketing service may include a wide variety of promotions, not all of which are of interest to all consumers. Furthermore, promotions may be offered for a limited time or inventory, such that consumers may miss out on a promotion in which they would otherwise be interested if the promotion expires before the consumer becomes aware of the promotion. Static electronic communication templates lack flexibility for adjusting the content of outgoing electronic communications in response to changing market realities, promotion inventories, and consumer preferences.

As a result of these problems and others that may arise from time to time, the marketing effectiveness of electronic communications previously known in the art may be limited. Ineffective marketing may result in reduced promotion sales. These reduced promotion sales may have the effect of reducing revenue for the promotion and marketing service, reducing revenue and a marketing return on investment received by merchants that offer the promotions, and reducing the ability of consumers to obtain desired promotions.

Accordingly, to overcome these problems, example embodiments of the present invention are shown for generating electronic communications in a manner that is more robust, efficient, dynamic, and data-driven to improve revenue and marketing operations for merchants, consumers, and the promotion and marketing service. Example embodiments may leverage access to historical promotion data and user preferences to select particular content generators for generating electronic communications. These content generators may be assigned to particular slots within an electronic communication template based on various scoring algorithms in order to maximize the efficiency of the electronic communication. In some example embodiments, characteristics such as promotion inventories, past consumer interactions with the promotion and marketing service, the content and efficacy of particular promotions, and the like may be used to inform selection of content generators for the electronic communication. In some embodiments, the electronic communication may be analysed according to a set of rules to ensure the electronic communication conforms to certain standards and criteria specified by the set of rules. For example, the rules may ensure that adjacent slots of the electronic communication do not contain the same or similar content, or that the electronic communication includes a variety of different promotion types.

The promotion and marketing service may also provide for the ability to modify, configure, update, and/or create content generators based on feedback (e.g., direct or indirect) received from consumers. For example, the efficacy of a particular content generator may be evaluated based on how frequently a consumer selects a promotion added to the electronic communication by the content generator.

Content generators may provide both promotion content (e.g., content that notifies a consumer of or describes a particular promotion or promotions) and non-promotion content (e.g., content not associated with a particular promotion or merchant, or merchant content that is not promotion related, such as non-discounted prices, merchant reviews, merchant patronage activity, or the like). For example, non-promotion content may include any content not generated solely for a particular promotion. For example, non-promotion content may include administrative content associated with management of a consumer profile (e.g., providing a login interface or an interface to edit the user's e-mail preferences), data gathering operations (e.g., providing an interface requesting the user's zip code for providing more targeted promotions), notifications (e.g., notifying a consumer of upcoming system maintenance), market rate ads, merchant information, social promotion, merchant interaction activity, promotion of a particular promotion and marketing system channel or line of business (e.g., advertising for a promotion category instead of a particular promotion), promotion trends (e.g., listing a currently trending promotion) or any other content not associated with a particular promotion.

Example embodiments of the present invention enhance the creation of electronic communications by utilizing content generators to select content for one or more slots of the electronic communication that results in an increased benefit derived from the electronic communication by merchants, consumers, and/or the promotion and marketing service. In addition, example embodiments of the present invention may be capable of providing improved targeting of promotion marketing materials and data gathering operations to improve the accuracy of promotion targeting to particular consumers. Example embodiments may also provide for improved analytics to monitor the efficacy of electronic communications, content generators, and/or particular content employed by the promotion and marketing service. These analytics may be employed to further configure the promotion and marketing service to improve the efficacy of promotion marketing operations.

System Architecture

The method, apparatus, and computer program product of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, an example embodiment may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Sales representatives and merchants may access a promotional system 102 via a network 112 (e.g., the Internet, or the like) using computer devices 114A through 114N and 116A through 116N, respectively (e.g., one or more sales representative devices 114A-114N or one or more merchant devices 116A-116N). Moreover, the promotional system 102 may comprise a promotional server 104 in communication with a promotional database 106. The promotional system may further have access to a content generator datastore 110 storing a plurality of content generators and a communication template datastore 111. The promotional system 102 is, in some examples, able to generate one or more electronic communications using content generators selected from the content generator datastore 110, as will be described below.

The promotional server 104 may be embodied by a computing system, such as apparatus 200 shown in FIG. 2. As illustrated in FIG. 2, the apparatus 200 may include a processor 202, a memory 204, an input/output module 206, a communications module 208, a slot manager module 210, and/or an electronic communication creation module 214. The apparatus 200 may be configured to execute the operations described below. In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 202 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display and may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The slot manager module 210 may select one or more content generators from the content generator datastore 110 to populate slots of an electronic communication with content. As described above, different content generators may be associated with different content, types of content, or the like. The slot manager module 210 may select content generators according to various methods, processes, rules, algorithms, and the like. The slot manager module 210 may utilize various data to select content generators, including but not limited to user preference data, user engagement data, historical promotion information, promotion inventory information, promotion budget information, the results of a real-time (e.g., performed dynamically as electronic communications are requested and/or sent) slot "auction", and the like. Some examples of the ways in which these data may be employed to assist with selection of content generators are described further below with respect to FIGS. 5-10. In some embodiments, the slot manager module 210 may perform a scoring operation, assigning a score to different content generators for a particular slot in an electronic communication and evaluating the content provided by the content generators according to various quality metrics. In some embodiments, the scoring may be determined by the content generators themselves, and the slot manager may evaluate the score provided by the content manager to determine a suitability of the content generator for the electronic communication. The content generators may be assigned to the electronic communication based on the score. Assignment may include an evaluation of the content generator's own score based on a suitability or probability of consumer engagement and an evaluation of past scoring of content generators based on past performance of content generators.

The electronic communication creation module 214 may be operable to generate an electronic communication using content generators selected by the slot manager module 210. In some embodiments, the electronic communication creation module 214 may execute or cause the execution of the content generators selected by the slot manager module 210, such that the content generators provide content for an assigned slot within the electronic communication during execution. In some embodiments, slots within an electronic communication may be defined by an electronic communication template stored in the communication template datastore 111. For example, an electronic communication template may be selected for a particular outgoing electronic communication (e.g., a template for an e-mail or a webpage), and the electronic communication template may include data identifying the location, type, size, and the like of slots to be populated with content by the content generators. In some embodiments, the electronic communication template is manually chosen by a user from within the communication template datastore 111, while in some other embodiments the electronic communication template is automatically chosen by the slot manager module 210, by an electronic communication creation module 214, or by another element of the apparatus 200.

In some embodiments, particular slots may be identified as static or dynamic within an electronic communication template. For example, static slots may be a predefined set of content or a predefined content generator associated with the slot, while dynamic slots may have content generators allocated dynamically during generation of the electronic communication.

In some embodiments, the electronic communication creation module 214 may also evaluate the electronic communication after the electronic communication has been generated. For example, the electronic communication creation module 214 may utilize the selected content generators to generate a preliminary electronic communication, and the preliminary electronic communication may be evaluated to ensure that the preliminary electronic communication conforms with certain rules relating to the type of content, whether content is repeated, the proximity of certain content types to one another, and the like. An example process for evaluating a preliminary electronic communication is described further below with respect to FIG. 10.

It should be readily appreciated that the slot manager module 210 and the electronic communication creation module 214 may, like other components of the apparatus 200, have related and/or overlapping functionality, and that these modules may be implemented as a single module or multiple discrete modules. For example, a single module may both select content generators for an electronic communication and also use the selected content generators to generate an electronic communication.

In one embodiment, a representative of the promotion and marketing service may use the apparatus 200 to generate an electronic communication in accordance with example embodiments of the invention. However, other embodiments of the present invention may run outside of the promotional system 102, such as, for example, on an end-user device, such as sales representative device 114 or merchant device 116.

Referring now to FIG. 3, a block diagram is illustrated showing an example apparatus 300 that may be configured to enable a user to generate an electronic communication from outside the promotional system 102, in accordance with embodiments of the present invention.

In FIG. 3, the apparatus 300, which may embody sales representative device 114 or merchant device 116, may include or otherwise be in communication with a processor 302, a memory 304, a communications module 308, and a user interface 306. In some embodiments, the processor (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the apparatus to carry out various functions in accordance with an example embodiment of the present invention.

The processor 302 may be embodied in a number of different ways and may, for example include one or more processing devices configured to perform independently. Additionally or alternatively, the processor may include one or more processors configured in tandem via a bus to enable independent execution of instructions, pipelining, and/or multithreading.

In an example embodiment, the processor 302 may be configured to execute instructions stored in the memory 304 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 300 may include a user interface 306 that may, in turn, be in communication with processor 302 to provide output to the user and, in some embodiments, to receive an indication of a user input. As such, the user interface may include a display and may comprise a web user interface, a mobile application, a client device, a kiosk, or the like. In some embodiments, the user interface 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

Meanwhile, the communications module 308 may be any means such as a device or circuitry embodied in either hardware or a combination of hardware and software that is configured to receive and/or transmit data from/to a network and/or any other device or module in communication with the apparatus 300. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

Example Electronic Communication

As described above, example embodiments may function to generate an electronic communication by selecting one or more content generators to populate slots of the electronic communication. FIG. 4 illustrates an example electronic communication 400 as populated with content from content generators in accordance with some example embodiments. For example, the electronic communication 400 may be an e-mail as viewed in an e-mail viewing application, via a web-based e-mail service, as a webpage within a web browser (e.g., a website hosted by the promotion and marketing service), or within an application that is associated with the promotion and marketing service (e.g., a smartphone "app" provided by the promotion and marketing service).

The example electronic communication 400 includes a plurality of slots 402-416. As described above, these slots may be defined as particular regions of the electronic communication. In the present example, each of these slots 402-416 is populated with content. Some of the slots, such as the slot 402 and the slot 408 are populated with non-promotion content, such as an interface for allowing a consumer to provide a zip code or an interface allowing a consumer to provide additional data to provide improved promotion targeting accuracy, respectively. Other slots, such as the slot 404, the slot 406, and the slots 410-416 are populated with promotion content, corresponding to one or more promotions. In some embodiments, these slots may be populated with images, such as images stored in a Join Photographic Experts Group (JPEG), Graphics Interchange Format (GIF), or Bitmap (BMP) format. In some embodiments, performing a selection operation an image presented in one of these slots may direct the consumer to more information about the content associated with the slot. For example, selecting a promotion content slot may provide the consumer with additional information about the promotion and an interface allowing the consumer to purchase the promotion, or selecting a non-promotion content slot may provide the consumer with an interface for providing the data requested by the non-promotion content. It should be readily appreciated that the content provided to the slots 402-416 is not limited to image content. For example, slots may be associated with instructions for providing an interactive consumer experience, such as by providing an interface for the consumer to enter data, purchase a promotion, play a video, or the like.

In some embodiments, the electronic communication may be generated using an electronic communication template. The electronic communication template may include data defining the structure of the electronic communication, such as the location, size, type, and quantity of slots within the electronic communication. Content selected for each slot by the content generators may conform to the limitations of the particular slot of the electronic communication template to which the content generator is assigned. For example, if the content generator selects a particular image, the image may be sized to fit within the boundaries of the slot as defined within the electronic communication template. In some embodiments, the slot parameters specified within the electronic communication template may be used to inform the selection of particular content generators. For example, a content generator that only provides large banner-sized promotional images may not be selected for a smaller slot present in a sidebar of an electronic communication, or the content generator may provide a particular set of content based on the parameters of the slot to which the content generator is assigned.

Embodiments may also include the ability to dynamically generate an electronic communication template, or to edit or otherwise modify a provided electronic communication template. For example, a slot manager module may initially begin with an electronic communication template that lacks any slots, and slots within the electronic communication may be defined as content generators are selected. As another example, selected content generators may have a capacity to alter slot definitions based on a content generator scoring process. For example, a single content generator may win two adjacent slots within an electronic communication and, instead of presenting two separate sets of content, the content generator may instead elect to present one, combined set of content that fills both slots. In some embodiments, a content generator may bid for two adjacent slots simultaneously. For example, instead of bidding a first value X for a first slot and a second value Y for a second slot, the content generator may submit a single bid of (X+Y) for both slots in combination. It should be appreciated that the content generator may place a premium on combined slots in this manner (e.g., with a bid greater than (X+Y)), such that a bid for a combined slot is actually greater than the sum of bids for individual slots. Alternatively, a content generator may bid a discounted rate for combined slots (e.g., with a bid less than (X+Y)). The slot manager may be configured to manage multiple slot bids accordingly.

In some embodiments, the slot manager module may auction each slot on the electronic communication separately, possibly in parallel. Content generators may bid on one or more of the slots in these separate auctions as a part of the overall electronic communication generation process. As a consequence of these separate auctions, the slot manager may choose to remove duplicate content generators from the page as well as duplicate content within disparate content generators, since content generators may not be aware of content provided by other content generators, thus possibly resulting in duplicate content.

In some embodiments, the slot manager module may auction the entire electronic communication at once. Content generators may bid on participating in the page, rather than for a specific slot. The content generator scores/bids/ probabilities of engagement may be used in conjunction with the slot manager module's analysis and interpretation of the content generator's historical performance for the particular selection parameters to determine the selection and rank ordering of content generators across slots in the page. In such an embodiment, content generators may be aware of the entire electronic communication, and elect participation in a page as opposed to a particular slot within the page.

The electronic communication template may be implemented in a variety of manners. For example, some template implementations may include strict definition of how slots and content generators are configured, while other template implementations may allow for flexibility. In some embodiments, templates may include both clearly defined slots and more flexible slot definitions. For example, a template might indicate that it contains certain slots in a certain configuration, and each slot may be associated with a specific set of content generators allowed for the particular slot. These content generators may be selected based on an evaluation of type, quality of content, amount of content, or the like. Alternatively, a template might include slots that are associated with a plurality of different content generators, which can be populated by a variety of content generator types, slots that can expand or contract as determined by the slot manager module or content generators, or the like.

Example Electronic Communication Generation Data Flow

FIG. 5 illustrates an example data flow 500 representing the process by which electronic communications may be generated using one or more content generators. The data flow 500 illustrates how selection parameters 502, a content generator datastore 504, and a communication template 506 datastore may be utilized by a slot manager module 508 to select one or more content generators for one or more slots defined within an electronic communication template, and how these content generators may be used by an electronic communication creation module 510 to create an electronic communication 512.

The selection parameters 502 may include any data that may be used to improve selection of content generators to target the content of the electronic communication to a particular user or group of users, to promote a particular promotion, set of promotions, or type of promotion, or the like. For example, the selection parameters may include parameters related to a particular consumer, group of consumers, or a consumer characteristic that are the intended recipient of the electronic communication. For example, the selection parameters 502 may include information related to a particular consumer's past promotion purchases and redemptions, information related to which marketing content the consumer has previously received, information related to which marketing content the consumer has previously selected (e.g., promotions for which the consumer requested more information), promotions the consumer has purchased, information related to the consumer's location, or the like. Additionally or alternatively, the selection parameters may include system information supplied by the promotion and marketing service. For example, such system information might include promotion inventory levels (e.g., to assist with marketing promotions that have high inventory levels), content generator analytics (e.g., data indicating which content generators have been the most successful, or data indicating which content generators have not been provided recently), line of business information (e.g., data indicating that content generators for a particular line of business should be prioritized), promotion redemption rate information, or any other statistical or analytic data provided by the promotion and marketing service.

As described above with respect to FIG. 1, the content generator datastore 504 may include a plurality of content generators for selection by the slot manager module 506. As described above, content generators may include one or more processes, applications, algorithms, or the like for choosing content to populate one or more slots of an electronic communication, such as slots defined by an electronic communication template stored in a communication template datastore 508. The content generators may also include a set of assignment preference logic to provide the slot manager module 508 with information to assist the slot manager module 508 with performing slot assignments.

The slot manager module 508 may determine a score for each content generator for each slot within the electronic communication. The content generator assigned to the slot may be determined by the score, such as by assigning each slot to the content generator that had the highest score for that slot. In some embodiments, content generator scores may be determined by an "auction" or "bidding" process. For example, each content generator may submit a "bid" or "value" as defined by the assignment preference logic for the particular content generator, with the slot being assigned to the content generator with the highest bid. In some embodiments, the bid of the content generator may be associated with the particular selection parameters provided to the slot manager module. For example, a first content generator may be identified as having particularly good content (e.g., likely to result in a sale of a promotion) to consumers from a particular zip code. In the event the selection parameters indicate that the consumer is from the particular zip code, the assignment preference logic associated with the first content generator may indicate to the slot manager module 508 that the first content generator is willing to "bid" a high amount, while a second content generator that does not perform as well for that zip code may not be willing to "bid" as much for the slot. As such, the slot would be assigned to the first content generator. An example of a negotiation between a content generator and a slot manager module is described further below with respect to FIG. 10. As yet another example, the selection parameters might indicate that a particular consumer is logged in and that the consumer has a long history with the promotion and marketing service, such that content generators that specialize in making personalized recommendations might generate higher bids than content generators that specialize in marketing to anonymous consumers. In some embodiments, content generator bids are generated in parallel such that the content generators are unaware of the activity of other content generators, while the slot manager may be aware of the entire process.

In some embodiments, content generators may be associated with a particular "budget" to ensure that a particular content generator does not "win" all of the auctions. For example, every time the content generator wins a slot auction, the value of the winning bid may be deducted from the content generator's running budget, and the content generator may be unable to bid for additional slots once its budget is exhausted. In some embodiments, bids are used as one factor for selecting a content slot, but not necessarily the only factor or the determinative factor. For example, a content generator may be selected for a particular slot as a function of both the content generator's bid price and the content generator's historical performance. It should be appreciated that not all slots defined within the electronic communication template may be associated with equal "bid" values. For example, a first slot or top slot of the communication may have a larger minimum bid value, reflecting that the slot is likely to be the first slot viewed by the consumer.

In some embodiments, budgets may be defined for particular groups of content generators, such as different budgets for different promotion types (e.g., a budget for vacations, a budget for physical goods, and a budget for discount promotions). Each group of content generators may have different rules for spending their attendant budget, such as rules assigned by particular designers, owners or representatives for each group of content generators. In some embodiments, profits from consumer interaction with content generators may function to add to or replenish the budget for the content generator or owner of a group of content generators. For example, as consumers purchase promotions marketed by content generators by interacting with content provided by those content generators, the budget associated with those content generators may be credited for some amount commensurate with the purchases. In some embodiments, the promotion and marketing service may provide an interface allowing users (e.g., owners or managers of a particular group of content generators) to add, edit, or delete rules and bid logic for a group of content generators. In some embodiments, the slot manager module 508 may allow content generators to determine whether they wish to enter a competition for a particular slot. In such cases, the slot manager module may provide the content generator with information about the particular slot that is the subject of the competition (e.g., slot placement, size, cost, and type of electronic communication), and the particular content generators may use their assignment preference information to decide whether to compete for the slot and how much to bid for the slot.

In some embodiments, the slot manager module 508 may also function as a scheduler for content generators. In this regard, the content generator module 508 may, for example, ensure that particular content generators get a minimum amount of exposure to consumers (e.g., ensuring that a particular content generator is used in at least a minimum number of electronic communications to gather experimental data on the performance of the particular content generator).

The slot manager module 508 may select one or more content generators from the content generator datastore 504 and assign the selected content generators to one or more slots of an electronic communication template. The slot manager module 508 may provide the content generator assignments to an electronic communication creation module 510 to create the electronic communication.

The electronic communication creation module 510 may use the content generators to generate content to populate the slots of an electronic communication template to create an electronic communication. For example, the electronic communication creation module 510 may execute program code associated with the content generators, and, upon execution, the content generators may provide the electronic communication creation module 510 with content. Additionally or alternatively, the electronic communication creation module 510 may receive sets of content from the content generators (e.g., the content generators may execute independently from the electronic communication creation module 510 and send content for inclusion in their assigned slots via network messages or via an application programming interface).

Example Promotional System Operations

Turning now to FIG. 6, example operations for generating an electronic communication are illustrated from the perspective of a promotion and marketing service. The operations illustrated in FIG. 6 may, for example, be performed by the promotional system 102 (e.g., promotional server 104), with the assistance of, and/or under the control of one or more devices, such as apparatus 200, and may use the processor 202, the memory 204, the input/output module 206, the communications module 208, the slot manager module 210, and/or the electronic communication creation module 214.

FIG. 6 depicts a process 600 that may be employed to generate an electronic communication using one or more content generators. The content generators may provide content for one or more slots of the electronic communication, and the content generators may be selected based on one or more selection parameters provided to the process 600. Embodiments may advantageously generate electronic communications in a flexible, efficient manner that ensures that content is properly targeted to optimize the marketing value of the generated electronic communication.

In operation 602, the apparatus 200 includes means, such as input/output module 206, communications module 208, or the like, for receiving selection parameters. As described above with respect to FIGS. 1-5, the selection parameters may be received from various monitoring and analytic functions performed by a promotion and marketing service.

In operation 604, the apparatus 200 includes means, such as processor 202 or the like, for receiving an electronic communication template. As described above, the electronic communication template may include data that defines one or more slots for content in an electronic communication. The data may include sizes, locations, types, and the like for each slot. In some embodiments, the electronic communication template may include certain metadata about the electronic communication template itself. For example, the electronic communication template may specify a particular communication type (e.g., e-mail, website, or application), a particular target consumer demographic, a particular target promotion type, or the like. The electronic communication template may be received in response to a user selection (e.g., by using an interface to select a particular electronic communication type for generation), in response to a consumer selecting a type of promotion in which the consumer is interested, in response to a consumer opening an e-mail provided to the consumer, in response to the consumer visiting a web page, or automatically selected by the promotion and marketing service (e.g., in response to determining that a particular marketing communication should be sent). In some embodiments, electronic communications may be prompted by merchants, such as in a case where the merchant requests the promotion and marketing service to initiate a particular marketing campaign.

In operation 606, the apparatus 200 includes means, such as processor 202 or the like, for determining a content generator based on the received selection parameters. For example, as described above with respect to FIGS. 1-5, content generators may be selected based on various criteria, such as but not limited to parameters of the target consumers or parameters associated with the promotion and marketing service. As described above, content generators may be scored for particular slots, with the content generator with the highest score for a particular slot being assigned to the slot. In some embodiments, the scores may be determined using an auction process by which content generators bid for one or more of the slots within the electronic communication.

In optional operation 608, the apparatus 200 includes means, such as processor 202 or the like, for adjusting the content generator selections based on a set of electronic communication rules. As described above, elements of the promotion and marketing service may enforce certain rules for electronic communications. For example, it may be undesirable to display promotions from two competitors in adjacent slots, and it may be desirable to ensure a diverse mix of promotions in a particular electronic communication. At operation 608, the content generators selected at action 606 may be evaluated to ensure that these rules are followed.

For example, if two adjacent slots have both been assigned to "restaurant" content generators, the process may adjust one of the slot assignments to select an alternative content generator. In some embodiments, the selected alternative content generator may be a next highest scoring content generator for that particular slot that also satisfies the electronic communication rules. In some embodiments, the electronic communications rules may be evaluated at the time the content generators are selected, to ensure that the selected content generators satisfy the electronic communications rules. In some embodiments, electronic communications rules are associated with particular content generators. For example, the electronic communications rules may be derived from assignment preference logic associated with the selected content generators.

In operation 610, the apparatus 200 includes means, such as processor 202 or the like, for populating the electronic communication with content using the selected content generator(s). The slots of the electronic communication may be populated with content received from or derived by the selected content generators, such that each particular slot within the electronic communication is populated by the content generator assigned to the particular slot. For example, a given slot may be associated with a particular promotion and populated with a particular image associated with the promotion and a hyperlink to enable purchasing of the promotion or to obtain additional information about the promotion. In some embodiments, the content generator may dynamically determine the content for the slot based on one or more of the selection parameters. For example, if a consumer has previously purchased several promotions with a particular image type (e.g., a picture of food offered by a restaurant for a restaurant promotion), then the content generator may select a similar image type for a slot in a communication sent to the consumer (e.g., a picture of the restaurant's food, as opposed to a picture of the restaurant's sign or bar area).

In operation 612, the apparatus 200 includes means, such as processor 202 or the like, for providing the electronic communication to a consumer. For example, the apparatus may include means for sending an e-mail (e.g., an e-mail server), providing a web page (e.g. a web server), or displaying content on a mobile device screen (e.g., via an "app" executing on a smartphone or tablet computer) to a consumer, such as a consumer associated with the selection parameters.

In optional operation 614, the apparatus 200 may include means, such as processor 202 or the like, for monitoring an interaction of the consumer with the electronic communication. For example, the process 600 may include monitoring of consumer selections (e.g., mouse clicks or website impressions) of the different slots within the electronic communication. Monitoring of the consumer's interaction with the electronic communication in this manner may provide analytic data to the promotion and marketing service to assist with improvement of future electronic communications.

In optional operation 616, the apparatus 200 may include means, such as processor 202 or the like, for updating the selection parameters based on the consumer interaction. In this manner, the process 600 may update the use of the selection parameters within the content generator selection process to improve future selection of content generators and content by the content generators.

Example Content Generator Selection Processes

Turning now to FIGS. 7-9, example operations are shown for selecting a content generator for a particular slot of an electronic communication. As described above, content generators may be assigned to slots of the electronic communication according to various processes. FIGS. 7-9 illustrate examples of different techniques that may be employed, individually or in combination, to associate a content generator with a slot. The processes described in FIGS. 7-9 may be performed by an apparatus, such as the apparatus 200 described above with respect to FIG. 2.

FIG. 7 illustrates a process 700 for selecting a content generator based on a score. In operation 702, the apparatus 200 may include means, such as processor 202 or the like, for calculating scores for a plurality of content generators. The scores may be calculated for a particular slot of an electronic communication. As described above, the score for each content generator may be determined based on the assignment preference logic associated with the particular content generator. Assignment of a score may additionally or alternatively include an auction process by which content generators bid on the particular slot. In some embodiments, the score may only be calculated for content generators that submit a bid for the particular slot.

A scoring algorithm may be employed that takes into account the appropriateness of the content generator for the particular slot, including consideration of the selection parameters. For example, as described above, certain content generators may be particular appropriate for certain selection parameters, such as content generators that specialize in bringing in unregistered consumers or content generators for promotion types that are associated with past promotions purchased by a particular consumer. Such particularly appropriate content generators may be ascribed a higher score during the content generator selection process upon detection of the particular selection characteristic. The score assigned to a particular content generator may be based on logic associated with the content generator. For example, each content generator may have a separate set of logic defining whether and how the content generator will "bid" for a particular slot. The score may be generated based on factors including, but not limited to, the bid submitted by each content generator for each slot.

In operation 704, the apparatus 200 may include means, such as processor 202 or the like, for selecting a particular content generator for the slot based on the score determined at operation 702. As described above, the content generator with the highest score may be selected for the slot.

FIG. 8 illustrates a process 800 for selecting a content generator based on a score derived from selection parameters and a promotion content engagement factor. As used herein, the term "promotion content engagement factor" should be understood to refer to feedback received in response to consumer interactions with provided electronic communications. For example, the promotion content engagement factor may be determined based on the amount of time the consumer places their cursor on a particular set of content (e.g., "hover" information), based on whether the consumer selects a particular set of content with a cursor (e.g., "click-through" information), or whether the consumer purchases a promotion associated with a particular set of content (e.g., "promotion content purchase information"). Similarly to the process 700, the process 800 may be operable to determine a score for a plurality of content generators and to select a content generator based on the score.

In operation 802, the apparatus 200 may include means, such as processor 202 or the like, for receiving an engagement factor. As described above with respect to FIG. 5, embodiments may provide for means to monitor the interaction of a consumer with an electronic communication generated using one or more content generators. These monitored interactions may be received and used to determine a content engagement factor. In some embodiments, the promotion content engagement factor may be considered to be one of the selection parameters.

In operation 804, the apparatus 200 may include means, such as processor 202 or the like, for scoring a plurality of content generators based on selection parameters and the promotion content engagement factor. As described above, a score may be calculated for each content generator eligible for a particular slot, and in operation 806, the apparatus 200 may include means, such as processor 202 or the like, for assigning the content generator with the highest score to the slot.

FIG. 9 illustrates a process 900 for assigning content generators to electronic communication slots based on a slot type. As described above with respect to FIGS. 1-5, slots may be associated with particular types. For example, some slots may be associated with promotion content, some slots may be associated with non-promotion content, some slots may be associated with a particular merchant type (e.g., restaurants, spa treatments), some slots may be associated with particular promotion types (e.g., high value promotions, vacation promotions, inexpensive promotions, discount value promotions, goods purchase promotions), or the like.

In operation 902, the apparatus 200 may include means, such as processor 202 or the like, for determining a slot content type. For example, an electronic communication template may specify certain content types for one or more of the slots defined within the electronic communication template.

In operation 904, the apparatus 200 may include means, such as processor 202 or the like, for selecting a content generator based on the slot content type. For example, a content generator that provides non-promotion content may be assigned to a slot that is designated for non-promotion content. In some embodiments, content generators may be capable of generating multiple different types of content, and the generated content may be constrained by the slot type. For example, if the content generator is capable of generating vacation promotion content and discount promotion content, and the slot is designated as a "vacation" slot, then the content generated by the content generator for the slot may be constrained to only vacation promotion content.

Example Module Interaction and Content Generator Slot Auction

FIG. 10 presents an example of interactions between an electronic communication creation module, a slot manager module, and a content generator in accordance with embodiments of the present invention. As described above, a slot manager module may select one or more content generators for use by an electronic communication creation module to generate one or more electronic communications. The slot manager module may interact with one or more content generators to select appropriate content generators for use by the electronic communication section module. In some embodiments, the electronic communication module, the slot manager module, and the content generators may communicate with one another via various data transmissions or signals. Although the instant example depicted in FIG. 10 illustrates three separate elements in communication with one another, it should be readily appreciated that the elements could be implemented as more than three or fewer than three separate elements.

At operation 1002, the slot manager module may receive an electronic communication template. As described above, the electronic communication template may be selected by a user, automatically selected from an electronic communication datastore by the slot manager module, or dynamically generated or edited in response to the selection of particular content generators by the slot manager module.

In order to select one or more content generators, the slot manager module may receive selection parameters at operation 1004. The selection parameters may include, as described above, user demographic information, a user's history of promotion purchases and redemptions, whether the user is registered with the promotion and marketing system, promotion inventory levels, promotion and marketing system business considerations (e.g., whether a particular line of business should be promoted more or less heavily), or the like.

At optional operation 1006, a content generator may receive content generator-specific information. As described above, content generators may receive additional or alternative data to the slot manager module. For example, a particular content generator might relate to ticket sales for sports teams. Such a content generator might monitor statistics or data feeds for various sports teams to identify teams that are performing well, or teams that have advanced to the playoffs, in order to prioritize promotions for those successful teams. It should be appreciated that content generators may be implemented in a flexible, modular manner that allows authors of the content generator to receive information from any data source as contemplated by the author. As additional specific, non-limiting examples, the content generator may access data related to news feeds, movie schedules, economic indicators (e.g., stock market data, bond interest rate data, mortgage rates, or the like), or horoscope information.

At action 1008, the slot manager module may identify one or more content generators as eligible for inclusion in the electronic communication. The slot manager module may constrain the content generators available for selection for a variety of reasons. For example, the electronic communication template may include a list of "authorized" content generators for use in the template, or the slot manager module may limit the available content generators to content generators that have not been used recently. Constraints may also be imposed on the content generators themselves, such that content generators are available, but limited in some manner. For example, a given content generator may be authorized for a particular slot, but only a certain subset of the content generated by the content generator may be authorized for a slot. As a specific example, a "restaurant promotions" content generator might only be constrained to only provide promotions associated with a user's zip code. These constraints may be passed to content generators for use in generation of content as described further below with respect to operations 1010 and 1012.

In some embodiments, the content generator operates as a closed-loop system to measure content generator performance and use the measured performance to improve the selection process. In such embodiments, the slot manager module may be considered to represent a variation of the "multi-armed bandit" problem. The multi-armed bandit problem refers to a scenario where a user is confronted with several possible payoff scenarios which have a certain probability of payment, but without knowledge of the expected pay-out probability of each scenario. For example, a gambler may be associated with choosing several slot machines, each of which has an unknown pay-out rate. In order to efficiently allocate resources among the unknown scenarios (e.g., to decide which slot machine to play), the user must balance their scenario selections between "exploration" (e.g., exploratory plays on slot machines to attempt to determine the pay-out rate of each machine) and "exploitation" (e.g., playing on slot machines expected to have the highest payment in an effort to receive a reward). Similarly to the gambler described above, the slot manager module may attempt to maximize overall revenue by "exploring" certain content generators (e.g., using the content generators in electronic communications to test the effectiveness of the content generator) and "exploiting" content generators (e.g., selecting content generators that are known or suspected to be good for a particular electronic communication). The slot manager module may employ various techniques, methods, and algorithms for choosing content generators to balance between these two interests. For example, the slot manager may initiate "A/B" testing by providing two separate content generators to consumers that provide similar selection parameters, and an analytic module (e.g., the analytic module 212 described with respect to FIG. 2) may monitor the performance of the two content generators to determine which is a superior content generator for the particular set of selection parameters. Additionally or alternatively, the slot manager or content generator may perform such A/B testing within content provided by a single content generator (e.g., displaying the same promotion indicated by the content generator, but with different pictures in different electronic communications).

It should be readily appreciated that the same or similar techniques could be employed to select between content generators that provide promotion content as opposed to content generators that provide non-promotion content. For example, non-promotion content may be used to gather additional consumer data (e.g., a location entry form) which may improve targeting of later electronic communications to the consumer. However, selection of non-promotion content to fill a slot would typically result in that slot not being used for a promotion, thus incurring an opportunity cost to include data-gathering content. As such, the slot manager may employ various methods and processes to determine whether and how to select content generators associated with promotion content or non-promotion content.

At operation 1010, one or more of the content generators may be notified of the electronic communication slot. For example, the slot manager module may transmit a signal to each content generator identified as eligible at operation 1008, or the slot manager module may notify all content generators. The notification sent to the content generators may also include the selection parameters received at action 1006, and any constraints for the content generators.

At operation 1012, the content generator may submit a bid for the slot identified by the slot manager module at action 1010. For example, the content generator may process the information provided by the slot manager module along with additional information available to the content generator (e.g., as received at operation 1004), and submit a "bid" to the slot manager module. This bid, as described above, may be generated according to a set of logic specific to the content generator. The bid may reflect how desirable the particular slot or selection parameters are to the content generator. For example, a content generator that is specialized in providing local deals may submit a lower bid if the selection parameters do not include a user location (e.g., "10" on a scale of 0 to 100), a higher bid if the selection parameters include the user's zip code (e.g., "70" on a scale of 0 to 100), and an even higher bid if the user's exact address is known (e.g., "90" on a scale of 0 to 100). The content generator may send a signal to the slot manager module notifying the slot manager of the content generator's bid.

At operation 1014, the slot manager module may determine a winning content generator for the slot. As described above, the winning content generator may be determined by a variety of factors which may include, but are not limited to or necessarily require, bids submitted by the content generators, past performance of the content generators, or a need or desire to gather analytic data for certain content generators, or the like.

At operation 1016, the electronic communication template and the selected content generators are provided to the electronic communication creation module. At operation 1018, the electronic communication module may query the content generators directly to obtain content to be included in the electronic communication, or content may be directly included in a slot bid as part of operation 1012. At operation 1020, the content generator may provide the content to the electronic communication creation module (e.g., by a process as described further below with respect to FIG. 12), and at action 1022 the electronic communication creation module may generate the electronic communication.

Example Content Generator

Turning now to FIG. 11, an example of a content generator 1100 is shown for providing content to an electronic communication creation module. As described above, the content generator 1100 may be a module comprising hardware and/or software executed to select content for a particular slot of an electronic communication. The content generator 1100 may include one or more assets 1102, one or more data interfaces 1104, and logic 1106.

The assets 1102 may include content for inclusion in the electronic communication, such as images, text, audio files, video files, uniform resource locators, or any other content types that may be provided to users in an electronic communication. Particular assets may be selected by the logic 1106 for inclusion in the electronic communication (e.g., images and text associated with a particular promotion selected by the logic 1106). The data interfaces 1104 may refer to various methods of obtaining data from external to the content generator. For example, the data interfaces 1104 may include code for receiving data from one or more data feeds (e.g., Really Simple Syndication feeds, an internal real-time messaging bus, or via one or more APIs established by the promotion and marketing service), databases, or the like. In some embodiments, the data interfaces 1104 may also include an interface for receiving data from a slot manager module and/or an electronic communication creation module, such as over a network.

The logic 1106 may include instructions for controlling the actions of the content generator. For example, the content generator 1100 may include assignment preference logic 1108, content selection logic 1110, and content formatting logic 1112. It should be readily appreciated that while specific types of logic are enumerated and described herein, the logic could include various additional or alternative instructions for controlling the content generator 1110. Although presented as a single block 1106, it should be readily appreciated that the logic may be separated into various elements that are executed at different times or by different systems or modules. For example, a set of assignment preference logic 1108 might execute on the same node as a slot manager module, and content selection logic 1110 and content formatting logic 1112 might be executed by an electronic communication creation module at a later time.

The assignment preference logic 1108 may include logic used by the content generator to inform the slot manager of the content generator's preference for certain slots in an electronic communication. For example, the assignment preference logic 1108 may control the "bid" logic described above, allowing the content generator to determine a bid for a particular content slot based on one or more selection parameters. The assignment preference logic 1108 may process the selection parameters and/or slot information provided to the content generator by the slot manager, in addition to any data received via the data interface 1104, to determine the bid placed by the content generator.

The content selection logic 1110 may function to determine which content to display (e.g., which promotion or non-promotion content to insert into a slot). As with the assignment preference logic 1108, the content selection logic 1110 may determine which content to provide based on various factors, including but not limited to the selection parameters, any external data received by the content generator, analytics provided to the content generator, particular characteristics of the assigned slot (e.g., size, shape, or placement within the electronic communication, the type of electronic communication, the viewing device used to view the electronic communication), or the like. For example, content selected by a non-promotion content generator might be determined by examining which information is present for a particular consumer indicated by the selection parameters, determining which consumer information is missing, determining which missing information has the highest expected value (e.g., the information that, if possessed by the promotion and marketing service, would most improve future electronic communications targeted to the consumer), and generating content to request the missing information with the highest expected value.

The content formatting logic 1112 may function to determine the presentation of content selected by the content selection logic 1110. For example, the content formatting logic may determine which particular image to provide for a particular promotion (e.g., an image of a restaurant table as opposed to a picture of the food), the size, shape, or other presentation characteristics of the selected content. The content formatting logic 1112 may also function to format the content for the particular slot, such as by altering the size or shape of the content to fit the slot. In some embodiments, the content formatting logic 1112 may be operable to request or perform alterations to the content slot. For example, the content generator may bid on, and win, two adjacent slots, and the content formatting logic 1112 may format a set of content to fill both adjacent slots with a single, larger, set of content. The content formatting logic 1112 may include logic for determining how applicable certain content is given content or slot constraints established for the electronic communication. The content formatting logic 1112 may also include logic for altering the presentation of the content based on the type of electronic communication. For example, a content generator may alter the presentation of the content for a mobile device browser display as compared to a desktop web browser display.

Turning now to FIG. 12, an example data flow 1200 for generating content using a content generator 1208 is provided. The example data flow 1200 illustrates how information may be provided to a content generator 1208 from various sources, which may include but are not limited to selection parameters 1202, content generator-specific data 1204, and slot manager constraints 1206. The selection parameters 1202 may include parameters provided by a slot manager module, as described above with respect to FIGS. 1-11. The content generator-specific data 1204 may include data accessible to the content generator 1208, but not necessarily provided by the slot manager module. For example, as described above, a content generator focused on promoting sports ticket sales might receive data from sports team standings, a content generator focused on promoting movie tickets might receive movie box office data, or the like. The slot manager constraints 1206 might include constraints imposed by a particular electronic communication template, such as the size or shape of a particular content slot, a type of promotion associated with the template, or the like.

The content generator 1208 may process the selection parameters 1202, content generator-specific data 1204, and slot manager constraints 1206 to generate a set of content, such as the car promotion 1210 depicted in FIG. 12. As described above, the content generator 1208 may select the particular promotion from among a plurality of promotions and format the promotion for display in an electronic communication.

Example Electronic Communication Rule Enforcement

As described above with respect to FIGS. 4-6, generation of an electronic communication may include enforcing certain rules. These rules may ensure that the electronic communication is efficiently provided and properly formatted, such as by ensuring that the electronic communication does not include duplicate entries or the like. Enforcement of these rules may include generation of a preliminary electronic communication to evaluate if the preliminary electronic communication violates any of the rules. FIG. 13 depicts an example 1300 of such a preliminary electronic communication.

The example preliminary electronic communication 1300 includes sets of content provided by one or more content generators. In the present instance, the preliminary electronic communication 1300 includes two potential rule violations. The first rule violation 1302 relates to two identical promotions being provided in adjacent slots. Such a violation might occur in the event where two different content generators are selected for adjacent slots. Since, in some embodiments, content generators may not be aware of the content selections made by other content generators, and some content generators may have overlapping sets of content, these duplicate entries may occur. As such, the preliminary electronic communication may be evaluated for duplicates content or duplicate content generators in the same electronic communication, with appropriate actions taken to remedy duplicates when detected. For example, one of the content generators selected by a slot manager module may be sent a signal indicating a duplicate was detected and the content generator should provide an alternative set of content. In some embodiments, content generators may over-select content, such as by proposing two sets of content for a single slot. The slot manager module may employ a prioritization algorithm to determine which content generator gets to "keep" the duplicated content, and the slot manager module may automatically select the next best alternative content proposed by the content generator with a lower priority. In this manner, the slot manager module may remove duplicates without the need to query the content generator with the lower priority for a new set of content. Alternatively, the rules might cause a merger of the two slots to present a single, larger promotion in place of the two duplicate entries. Such an action might be appropriate where the rules determine that the same content generator has been selected for two adjacent slots.

The second rule violation 1304 relates to display of competing content. Similarly to duplicate entries, it may not be desirable to display two similar or competing promotions adjacent to one another. In the present example violation 1304, a forest vacation promotion is displayed adjacent to a beach vacation promotion. As such, the rules violation 1304 might prompt a notification to be sent to one or both of the content generators associated with the two slots, requesting an alternative set of content for display. Additionally or alternatively, one or both of the sets of content might be swapped to a different slot by the slot manager, or the entire slot management for the electronic communication might be discarded to try again.

In order to ensure a proper evaluation of the content as compared to the rules for the electronic communication, each of the sets of content generated by the content generators may include a set of metadata to aid in the evaluation. For example, each set of content might include data indicating the type of merchant, the type of promotion, the discount value, a unique promotion identifier or any other data useful for evaluating a preliminary electronic communication. In this manner, the rules might include a set of conditional and logical operators (e.g., IF/ELSE, AND/OR/NOT, etc.) which specify actions to be taken in the event of detection of certain criteria (e.g., adjacent sets of content with the same merchant type or promotion identifier).

FIG. 14 illustrates an example embodiment of a process 1400 for evaluating an electronic communication based on a set of electronic communication rules. The electronic communication may be generated by processes as described above with respect to FIGS. 1-12. Although the process 1400 is described as evaluating a completed set of content after the content has been generated by selected content generators, it should be readily appreciated that the electronic communication could be evaluated for compliance with the set of electronic communication rules during the content generator selection process, or after the content generators have been selected but prior to populating any slots based on content received from assigned content generators. The process 1400 may be performed by an apparatus, such as the apparatus 200 described above with respect to FIG. 2.

In operation 1402, the apparatus 200 may include means, such as processor 202 or the like, for generating a preliminary electronic communication based on one or more selected content generators. The preliminary electronic communication may include a set of content received from content generators associated with slots of an electronic communication. As described above, the set of content may include promotional or non-promotion content for each slot as determined by the content generator associated with the slot. The preliminary electronic communication may represent an initial set of content as determined by the content generators, but the electronic communication may not be provided to consumers until the preliminary electronic communication has been evaluated for compliance with the electronic communication rules.

In operation 1404, the apparatus 200 may include means, such as processor 202 or the like, for evaluating whether the preliminary electronic communication complies with the electronic communication rules. As described above, the electronic communication rules may be derived based on various factors. For example, the electronic communication rules may be associated with one or more of the particular electronic communication template used to generate the electronic communication, the content generators assigned to the slots of the electronic communication template, or one or more selection parameters used to select the content generators. If the preliminary electronic communication complies with the electronic communication rules, the process 1000 may proceed to action 1006, where the electronic communication is finalized. Otherwise, the process 1000 proceeds to action 1008, where the preliminary electronic communication is modified to conform to the electronic communication rules.

In operation 1006, the apparatus 200 may include means, such as processor 202 or the like, for finalizing the preliminary electronic communication. Upon being finalized, the preliminary electronic communication may be transmitted or otherwise made available to one or more consumers.

In operation 1408, the apparatus 200 may include means, such as processor 202 or the like, for modifying the preliminary electronic communication to conform to the electronic communication rules. For example, if two content generators are associated with adjacent slots, the content generators have provided content relating to two competing merchants, and the rules specify that adjacent slots should not contain competing merchants, then the process may instruct one or both of the content generators to select an alternative set of content. As described above, one or both of the slots may be assigned a different content generator. It should be readily appreciated that while examples are given with respect to preventing competing products from appearing proximate to one another, various other rules could be employed, including but not limited to preventing duplicate promotions in the same electronic communication, preventing duplicate promotion types in the same communication, ensuring that promotions are offered above, below, or within a certain price range, or the like. After the electronic communication has been modified, the process 1400 returns to operation 1402, to repeat the evaluation process to ensure the modified electronic communication is compliant with the electronic communication rules.

Example Content Generator Analytics Data Flow

As described above with respect to FIGS. 1-6, a promotion and marketing service may include an analytics engine for monitoring the performance of various promotions and non-promotion content provided in electronic communications generated by the promotion and marketing service. This performance information may be used to derive analytics information to be used by content generators and a slot manager module. For example, analytics may be employed to improve the methods by which content generators are assigned to particular slots, how content generators determine their bids for particular slots, and how content generators determine which content to display in an assigned slot.

FIG. 15 depicts an example data flow 1500 that might be employed by an analytics module 1504 to provide for improved generation of electronic communications. As depicted in FIG. 14, an analytics module 1504 may receive a set of analytics information 1502. The analytics information 1502 may include, but is not limited to, various information such as promotion redemption rates (e.g., when a promotion is redeemed at a merchant in exchange for a good or service), promotion sales rates (e.g., when a consumer purchases a promotion from the promotion and marketing service), consumer impression rates (e.g., how frequently the promotion is displayed to a consumer), consumer click-through rates (e.g., how frequently the content is selected by a consumer to receive further information about the promotion), non-promotion content value information (e.g., a calculated value in displaying non-promotion content), the value of particular non-promotional consumer data, and the like.

The analytics module 1504 may process the analytics information to improve content generators stored in a content generator datastore 1506. For example, the analytics module 1504 may indicate to content generators whether or not a consumer selected content provided by the content generator. The content generator may utilize this information to improve targeting of future communications to the consumers and future bidding on slots for the same or similar consumers. For example, the content generator may employ a machine learning algorithm which weights particular selection parameters based on whether or not consumers associated with those parameters have selected content provided by the content generator.

Content generators may begin with a naïve estimate of the probability that a particular consumer or consumer demographic would be interested in a particular set of content. Over time, the analytics data provided to the content generator may notify the content generator of common characteristics of consumers that selected/engaged with content provided by the content generator. The content generator may thus target consumers with these particular characteristics (e.g., submit higher bids for consumers that have those characteristics) in later electronic communications based on prior successes.

Additionally or alternatively, a content generator may tailor content to particular consumers or consumer demographics based on analytics information. For example, a given promotion may be associated with three separate images. The content generator may monitor which consumers or consumer demographics select which image, and tailor future image selections based on the success or failure of past image selections for consumers with similar characteristics.

As yet another addition or alternative for evaluating analytics information, content generators may learn from past auction performance. For example, the content generator may determine if it always wins a particular slot or slot type for a certain set of selection parameters, then the content generator may reduce future bids for the same or similar slots, as always winning may be indicative of overbidding. Alternatively, if the content generator is always losing for a particular slot or slot type, then it may choose to increase future bids.

The analytics module 1504 may further inform the slot manager module 1508 of the success or failure of particular sets of content to improve the content generator selection process. For example, the slot manager module 1508 may determine future content generator selections based on whether or not a particular content generator was successful for consumers with similar characteristics as indicated by the selection parameters. Content generator bids may also be analyzed to improve future slot assignments. For example, a particular content generator may frequently submit high bids for a particular slot or slot type, but have a poor track record (e.g., few consumer engagements) when placed in that slot or slot type. The analytics module 1504 may thus notify the slot manager module of this behavior so the slot manager may reduce a selection weight accorded to high bids from that particular content generator in the future.

The analytics module 1504 may also provide analytics information via a content generator dashboard 1510. The content generator dashboard 1510 may provide statistical information on particular content generators for use in evaluating the success of the content generators. For example, the content generator dashboard 1510 may provide access to authors of the content generators to assist the authors with determining the success of the content generators. In some embodiments, the content generator dashboard 1510 may also provide content generator authors with the ability to edit or otherwise modify the behavior of content generators. For example, if a particular content generator is performing poorly for a particular user demographic, the content generator dashboard 1510 may provide the author of the content generator with the ability to reduce the slot bids generated by the content generator for electronic communications associated with the particular consumer demographic.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for generating an electronic communication comprised of a plurality of content slots, wherein each content slot is defined as a particular region of the electronic communication, and each of the plurality of slots is configured for displaying one or more promotions to a user interface and subsequently utilizing feedback data indicative of use engagement with the electronic communication, the method comprising:
   presenting promotion content and non-promotion content via an interface;
   receiving, via the interface, a user selection indication associated with at least one of the promotion content and the non-promotion content, the user selection indication comprised of information indicative of a user selection;
   updating, using a processor, a user record of a relevance database based on the user selection indication;
   updating, using the processor, a content generator record for a promotion content generator or a non-promotion content generator associated with the promotion content or the non-promotion content indicated by the user selection indication; and
   maintaining a database comprising a plurality of promotion content generators and non-promotion content generators,
   wherein the at least one of the promotion content generators or non-promotion content generators are configured to respectively generate the promotion content or the non-promotion content based at least in part on the user record, and wherein each of the promotion content generators and non-promotion content generators comprises respective content selection logic and content generator characteristics configured to generate particular types of content, wherein each of the plurality of promotion content generators and non-promotion content generators configured to target generated content of the electronic communication to a particular user or group of users, to promote a particular promotion, set of promotions, or type of promotion, each of the plurality of promotion content generators and non-promotion content generators configured utilize particular selection parameters, external data, and particular characteristics of an assigned slot to generate a particular type of content;
   providing, via the electronic communication, the plurality of content slots, wherein each content slot is defined as the particular region of the electronic communication, wherein each content slot is represented by a representative image, wherein each content slot is configured such that upon receiving a selection operation of the representative image, additional information related to the content associated with the content slot is displayed, and wherein each content slot comprises least one of promotion content or non-promotion content;
   determining, using a processor, one of the plurality of promotion content generators or non-promotion content generators for respectively supplying corresponding promotion content or non-promotion content to each of the plurality of content slots, wherein the determining the one of the plurality of promotion content generators or non-promotion content generators comprises:
      determining selection parameters, the selection parameters comprising parameters related to a particular consumer, group of consumers, or a consumer characteristic that are the intended recipient of the electronic communication,
      determining a promotion content engagement factor, the promotion engagement factor being feedback received in response to consumer interactions with provided electronic communications,
      wherein determining the promotion engagement factor is a function of an the amount of time the consumer places their cursor on a particular set of content, based on whether the consumer selects a particular set of content with a cursor, or whether the consumer purchases a promotion associated with a particular set of content, and
      scoring the plurality of promotion content generators and non-promotion content generators based at least in part on the selection parameters, the promotion content engagement factor, and the content generator characteristics;
   causing transmission of the electronic communication, the electronic communication comprising the particular set of content, generated by the selected content generators;
   upon display the particular set of content, receiving data indicative of one or more promotion engagement factors; and
   causing transmission of the data indicative of the one or more promotion engagement factors back to the electronic communication creation module, enabling refining of future content selection.

2. The method of claim 1, wherein an efficacy of one of the plurality of promotion content generators and non-promotion content generators is determined based on the user record.

3. The method of claim 2, further comprising selecting one of the plurality of promotion content generators and non-promotion content generators for use in generation of an electronic communication based on the efficacy.

4. An apparatus for generating an electronic communication comprised of a plurality of content slots, wherein each content slot is defined as a particular region of the electronic communication, and each of the plurality of slots is configured for displaying one or more promotions to a user interface and subsequently utilizing feedback data indicative of use engagement with the electronic communication, the apparatus comprising at least one processor and a memory, the memory comprising instructions that, when executed by the at least one processor, cause the at least one processor to configure the apparatus to:

present promotion content and non-promotion content via an interface;

receive, via the interface, a user selection indication associated with at least one of the promotion content and the non-promotion content, the user selection indication comprised of information indicative of a user selection;

update a user record of a relevance database based on the user selection indication;

update a content generator record for a promotion content generator or a non-promotion content generator associated with the promotion content or the non-promotion content indicated by the user selection indication; and maintain a database comprising a plurality of promotion content generators and non-promotion content generators, wherein the at least one of the promotion content generators or non-promotion content generators are configured to respectively generate promotion content or non-promotion content based at least in part on the user record, and wherein each of the promotion content generators and non-promotion content generators comprises respective content selection logic and content generator characteristics, configured to generate particular types of content each of the plurality of promotion content generators, wherein each of the plurality of promotion content generators and non-promotion content generators configured to target generated content of the electronic communication to a particular user or group of users, to promote a particular promotion, set of promotions, or type of promotion and non-promotion content generators configured utilize particular selection parameters, external data, and particular characteristics of an assigned slot to generate a particular type of content;

provide, via the electronic communication, the plurality of content slots, wherein each content slot is defined as the particular region of the electronic communication, wherein each content slot is represented by a representative image, wherein each content slot is configured such that upon receiving a selection operation of the representative image, additional information related to the content associated with the content slot is displayed, and wherein each content slot comprises at least one of promotion content or non-promotion content; and determine, using a processor, one of the plurality of promotion content generators or non-promotion content generators for respectively supplying corresponding promotion content or non-promotion content to each of the plurality of content slots, wherein the determining the one of the plurality of promotion content generators or non-promotion content generators comprises:

determining selection parameters, the selection parameters comprising parameters related to a particular consumer, group of consumers, or a consumer characteristic that are the intended recipient of the electronic communication, determining a promotion content engagement factor, the promotion engagement factor being feedback received in response to consumer interactions with provided electronic communications, wherein determining the promotion engagement factor is a function of an the amount of time the consumer places their cursor on a particular set of content, based on whether the consumer selects a particular set of content with a cursor, or whether the consumer purchases a promotion associated with a particular set of content, and score the plurality of promotion content generators and non-promotion content generators based at least in part on the selection parameters, the promotion content engagement factor, and the content generator characteristics;

cause transmission of the electronic communication, the electronic communication comprising the particular set of content, generated by the selected content generators;

upon display the particular set of content, receive data indicative of one or more promotion engagement factors; and cause transmission of the data indicative of the one or more promotion engagement factors back to the electronic communication creation module, enabling refining of future content selection.

5. The apparatus of claim 4, wherein an efficacy of one of the plurality of promotion content generators and non-promotion content generators is determined based on the user record.

6. The apparatus of claim 5, further configured to select one of the plurality of promotion content generators and non-promotion content generators for use in generation of an electronic communication based on the efficacy.

7. A non-transitory computer readable medium configured for generating an electronic communication comprised of a plurality of content slots, wherein each content slot is defined as a particular region of the electronic communication, and each of the plurality of slots is configured for displaying one or more promotions to a user interface and subsequently utilizing feedback data indicative of use engagement with the electronic communication, comprising instructions that, when executed by a processor, cause the processor to configure an apparatus to:

present promotion content and non-promotion content via an interface;

receive, via the interface, a user selection indication associated with at least one of the promotion content and the non-promotion content, the user selection indication comprised of information indicative of a user selection;

update a user record of a relevance database based on the user selection indication;

update a content generator record for a promotion content generator or a non-promotion content generator associated with the promotion content or the non-promotion content indicated by the user selection indication; and maintain a database comprising a plurality of promotion content generators and non-promotion content generators, wherein the at least one of the promotion content generators or non-promotion content generators are configured to respectively generate promotion content or non-promotion content based at least in part on the user record, and wherein each of the promotion content generators and non-promotion content generators comprises respective content selection logic and content generator characteristics configured to generate particular types of content, wherein each of the plurality of promotion content generators and non-promotion content generators configured to target generated content of the electronic communication to a particular user or group of users, to promote a particular promotion, set of promotions, or type of promotion, each of the plurality of promotion content generators and non-promotion content generators configured utilize particular selection parameters, external data, and particular characteristics of an assigned slot to generate a particular type of content;

provide, via the electronic communication, the plurality of content slots, wherein each content slot is defined as the particular region of the electronic communication, wherein each content slot is represented by a representative image, wherein each content slot is configured such that upon receiving a selection operation of the representative image, additional information related to the content associated with the content slot is displayed, and wherein each content slot comprises at least one of promotion content or non-promotion content; and determine, using a processor, one of the plurality of promotion content generators or non-promotion content generators for respectively supplying corresponding promotion content or non-promotion content to each of the plurality of content slots, wherein the determining the one of the plurality of promotion content generators or non-promotion content generators comprises:

determining selection parameters, the selection parameters comprising parameters related to a particular consumer, group of consumers, or a consumer characteristic that are the intended recipient of the electronic communication, determining a promotion content engagement factor, the promotion engagement factor being feedback received in response to consumer interactions with provided electronic communications, wherein determining the promotion engagement factor is a function of an the amount of time the consumer places their cursor on a particular set of content, based on whether the consumer selects a particular set of content with a cursor, or whether the consumer purchases a promotion associated with a particular set of content, and score the plurality of promotion content generators and non-promotion content generators based at least in part on the selection parameters, the promotion content engagement factor, and the content generator characteristics;

causing transmission of the electronic communication, the electronic communication comprising the particular set of content, generated by the selected content generators;

upon display the particular set of content, receiving data indicative of one or more promotion engagement factors; and causing transmission of the data indicative of the one or more promotion engagement factors back to the electronic communication creation module, enabling refining of future content selection.

8. The computer readable storage medium of claim 7, wherein an efficacy of one of the plurality of promotion content generators and non-promotion content generators is determined based on the user record.

9. The computer readable storage medium of claim 8, wherein the instructions further cause the processor to configure the apparatus to select one of the plurality of promotion content generators and non-promotion content generators for use in generation of an electronic communication based on the efficacy.

10. The method of claim 1, wherein the promotion content engagement factor is determined based on promotion content hover information.

11. The method of claim 1, wherein the promotion content engagement factor is determined based on promotion content click-through information.

12. The method of claim 1, wherein the promotion content engagement factor is determined based on promotion content purchase information.

13. The apparatus of claim 4, wherein the promotion content engagement factor is determined based on promotion content hover information.

14. The apparatus of claim 4, wherein the promotion content engagement factor is determined based on promotion content click-through information.

15. The apparatus of claim 4, wherein the promotion content engagement factor is determined based on promotion content purchase information.

16. The computer readable storage medium of claim 7, wherein the promotion content engagement factor is determined based on promotion content hover information.

17. The computer readable storage medium of claim 7, wherein the promotion content engagement factor is determined based on promotion content click-through information.

18. The computer readable storage medium of claim 7, wherein the promotion content engagement factor is determined based on promotion content purchase information.

* * * * *